(12) United States Patent
Haraguchi et al.

(10) Patent No.: US 11,470,699 B2
(45) Date of Patent: *Oct. 11, 2022

(54) LIGHTING CONTROL SYSTEM

(71) Applicant: NICHIA CORPORATION, Anan (JP)

(72) Inventors: Kei Haraguchi, Itano-gun (JP); Kenji Asai, Naruto (JP); Munetake Fukunaga, Tokushima (JP); Yasuo Fujikawa, Yokohama (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/166,450

(22) Filed: Feb. 3, 2021

(65) Prior Publication Data

US 2021/0160979 A1    May 27, 2021

Related U.S. Application Data

(63) Continuation of application No. 16/840,525, filed on Apr. 6, 2020, now Pat. No. 10,959,304.

(30) Foreign Application Priority Data

Apr. 9, 2019  (JP) .............................. JP2019-074278
Feb. 26, 2020 (JP) .............................. JP2020-030910

(51) Int. Cl.
   *H05B 45/20*     (2020.01)
   *H05B 45/10*     (2020.01)

(52) U.S. Cl.
   CPC ............. *H05B 45/20* (2020.01); *H05B 45/10* (2020.01)

(58) Field of Classification Search
   CPC ........ H05B 45/10; H05B 45/20; H05B 47/16; H05B 47/19; H05B 47/105; H05B 47/155;
   (Continued)

(56) References Cited

U.S. PATENT DOCUMENTS 7,014,336 B1   3/2006  Ducharme et al.
7,572,028 B2   8/2009  Mueller et al.
(Continued)

FOREIGN PATENT DOCUMENTS

JP   2011-258649 A   12/2011
JP   2015-106515 A    6/2015
(Continued)

OTHER PUBLICATIONS

Notice of Allowance on U.S. Appl. No. 16/840,525 dated Nov. 4, 2020.

*Primary Examiner* — Haissa Philogene
(74) *Attorney, Agent, or Firm* — Foley & Lardner LLP

(57) ABSTRACT

A lighting control system includes: a light fixture including a first light emitting device configured to emit light having a correlated color temperature in the range of ±500 K from a prescribed value, a second light emitting device configured to emit light having a correlated color temperature in the range of ±500 K from the prescribed value, and an emission controller configured to cause the light fixture to irradiate illumination light by controlling irradiation percentages of the light emitted from the first light emitting device and the light emitted from the second light emitting device; and an information processing apparatus communicably connected to the light fixture, the information processing apparatus comprising a dimming controller configured to change the irradiation percentages of the light emitted from the first light emitting device and the second light emitting device in accordance with a time of day by transmitting dimming instructions.

18 Claims, 13 Drawing Sheets

(58) Field of Classification Search
CPC ...... H05B 47/175; H05B 45/22; H05B 47/10; H05B 47/11; Y02B 20/40
See application file for complete search history.

(56) References Cited

U.S. PATENT DOCUMENTS

| | | |
|---|---|---|
| 9,955,551 B2 | 4/2018 | Spero |
| 10,420,184 B1 | 9/2019 | Soler et al. |
| 2011/0299277 A1 | 12/2011 | Ehara |
| 2014/0184088 A1 | 7/2014 | Lu et al. |
| 2015/0327342 A1 | 11/2015 | Lu et al. |
| 2017/0325310 A1 | 11/2017 | Chen et al. |
| 2018/0317296 A1 | 11/2018 | Chen et al. |
| 2021/0029789 A1* | 1/2021 | Ganick .................. G06N 20/00 |

FOREIGN PATENT DOCUMENTS

| | | | |
|---|---|---|---|
| JP | 2016-001622 A | 1/2016 | |
| JP | 2018-129492 A | 8/2018 | |
| JP | 2019-009126 A | 1/2019 | |

\* cited by examiner

16

| Tenant ID Code | Floor | Room | Basic Business Hours |
|---|---|---|---|
| 001 | 2 | 201 | 9:00~17:30 |
|  | 2 | 202 | 9:00~17:30 |
| 002 | 3 | 301 | 8:00~17:00 |
| 003 | 3 | 302 | 9:30~18:00 (Lunch Hour Light Off 12:00~13:00) |
|  | 4 | 401 | 10:00~19:00 (Lunch Hour Light Off 12:00~13:00) |
| ... | ... | ... | ... |

LIGHTING CONTROL SYSTEM

CROSS-REFERENCE TO RELATED APPLICATIONS

The present application is a continuation of U.S. patent application Ser. No. 16/840,525, filed on Apr. 6, 2020, which claims priority to Japanese Patent Application No. 2019-074278, filed on Apr. 9, 2019, and Japanese Patent Application No. 2020-030910, filed on Feb. 26, 2020, the disclosures of which are hereby incorporated by reference in their entireties.

BACKGROUND

The present invention relates to a lighting control system and a light fixture.

Lighting has become an essential element in buildings, such as offices, factories, commercial facilities, residences, and the like. In general, when a building with indoor spaces is constructed, lighting to illuminate the spaces is also installed.

Such indoor lighting, except for certain applications such as emergency lights, is usually provided for the purpose of creating a comfortable space for people to work. For this reason, color rendering quality is used as one of the factors to determine the quality of indoor lighting. Japanese Patent Publication No. 2018-129492 discloses a light emitting device having high color rendering quality, i.e., an average of rendering index (Ra) of 90 or higher.

In recent years, on the other hand, there has been a trend to give importance to considering the effect of lighting on the human body when creating a work environment. For example, there is a certification system known as WELL Certification (WELL Building Standards) administered by the International WELL Building Institute (IWBI). The WELL Certification system evaluates office buildings or the like on multiple features, such as air, water, nourishment, light, comfort and the like, and certifies those buildings that meet the standards.

For example, the evaluation criteria related to light in the WELL Certification include, as requirements, visual lighting design, circadian lighting design, and electric light and solar glare control. Color rendering quality is not a requirement, but an item for adding points.

As such, there is a need for lighting for illuminating indoor spaces where people work to not only have good color rendering quality, but also to address the effects on the human body.

SUMMARY

According to one embodiment, a lighting control system comprises: a light fixture comprising: a first light emitting device configured to emit light having a correlated color temperature in the range of ±100 K from a prescribed value, a second light emitting device configured to emit light having a correlated color temperature in the range of ±100 K from the prescribed value, and an emission controller configured to cause the light fixture to irradiate illumination light by controlling irradiation percentages of the light emitted from the first light emitting device and the light emitted from the second light emitting device; and an information processing apparatus communicably connected to the light fixture, the information processing apparatus comprising a dimming controller configured to change the irradiation percentages of the light emitted from the first light emitting device and the light emitted from the second light emitting device of the light fixture in accordance with a time of day by transmitting dimming instructions. The emission controller is configured to control the irradiation percentages of the light emitted from the first light emitting device and the light emitted from the second light emitting device based on the dimming instructions such that a difference between a maximum melanopic ratio of the illumination light and a minimum melanopic ratio of the illumination light is 0.01 or higher in a time period during which the illumination light is irradiated.

According to another embodiment, a lighting control system comprises: a light fixture comprising: a first light emitting device configured to emit light having a correlated color temperature in the range of ±100 K from a prescribed value, a second light emitting device configured to emit light having a correlated color temperature in the range of ±100 K from the prescribed value, and an emission controller configured to cause the light fixture to irradiate illumination light by controlling irradiation percentages of the light emitted from the first light emitting device and the light emitted from the second light emitting device; and an information processing apparatus communicably connected to the light fixture, the information processing apparatus comprising a dimming controller configured to change the irradiation percentages of the light emitted from the first light emitting device and the light emitted from the second light emitting device of the light fixture in accordance with a time of day by transmitting dimming instructions. The first light emitting device is configured to emit the light in the region of a CIE1931 color space chromaticity diagram defined by a first straight line connecting a first point whose x, y coordinates are (0.280, 0.070) and a second point whose x, y coordinates are (0.280, 0.500), a second straight line connecting the second point and a third point whose x, y coordinates are (0.013, 0.500), a pure purple locus extending from the first point towards smaller x values, and a spectral locus extending from the third point towards smaller y values. The emission controller is configured to control the irradiation percentages of the light emitted from the first light emitting device and the light emitted from the second light emitting device based on the dimming instructions such that, at least in a correlated color temperature range of 3000K to 5000K, a difference between a maximum melanopic ratio of the illumination light and a minimum melanopic ratio of the illumination light is 0.40 or higher in a time period during which the illumination light is irradiated.

According to another embodiment, a lighting control system comprises: a light fixture comprising: a first light emitting device configured to emit light having a correlated color temperature in the range of ±100 K from a prescribed value, a second light emitting device configured to emit light having a correlated color temperature in the range of ±100 K from the prescribed value, and an emission controller configured to cause the light fixture to irradiate illumination light by controlling irradiation percentages of the light emitted from the first light emitting device and the light emitted from the second light emitting device; and an information processing apparatus communicably connected to the light fixture, the information processing apparatus comprising a dimming controller configured to change the irradiation percentages of the light emitted from the first light emitting device and the light emitted from the second light emitting device of the light fixture in accordance with a time of day by transmitting dimming instructions. The first light emitting device is configured to emit light in a region of a CIE1931 color space chromaticity diagram defined by a first straight line connecting a first point whose x, y coordinates are (0.280, 0.070) and a second point whose x, y coordinates are (0.280, 0.500), a second straight line connecting the second point and a third point whose x, y coordinates are (0.013, 0.500), a pure purple locus extending from the first point towards smaller x values, and a spectral locus extending from the third point towards smaller y values. The emission controller is configured to control the irradiation percentages of the light emitted from the first light emitting device and the light emitted from the second light emitting device based on the dimming instructions such that, at least in a correlated color temperature range of 2700K to 6500K, a difference between a maximum melanopic ratio of the illumination light and a minimum melanopic ratio of the illumination light is 0.65 or higher in a time period during which the illumination light is irradiated.

Certain embodiments of the present disclosure can provide lighting better addressing the effects on the human body can be provided.

DETAILED DESCRIPTION

The effects of lighting on the human body will be explained first.

Taking the WELL Certification discussed in the background section for example, a circadian-effective lighting design is required. A circadian-effective lighting design means that the design addresses circadian rhythms.

The human circadian rhythm is longer than one day, i.e., about 25 hours, and unless adjusted to one day or 24 hours, it would be out of sync with the 24-hour day. Light plays an important role as a factor to synchronize the circadian rhythm with 24 hours. By being exposed to sunlight, human body's internal clock is adjusted to a 24-hour cycle. This allows humans to live in a natural daily rhythm, i.e., getting up in the morning and sleeping at night.

In other words, a human body is equipped with a synchronizing function that utilizes light in order to live in a 24-hour cycle. Specifically, there is an extremely small region of the brain in the hypothalamus called the supraoptic nucleus, which plays the role of setting the internal clock for the circadian rhythm. The intrinsically photosensitive retinal ganglion cells (hereinafter referred to as ipRGCs) give light signals to the supraoptic nucleus.

It has been found that ipRGCs contain a photoreceptor protein known as melanopsin, and that melanopsin is involved in photic entrainment of circadian rhythms. Melanopsin has wavelength-dependent absorption characteristics with a peak absorbance in the vicinity of 480 nm to 490 nm.

Moreover, melanopsin is said to be involved in secretion or restriction of melatonin, which is a sleep inducing hormone. It is believed that the secretion of melatonin is restrained, for example, by increasing the stimulus to ipRGCs. Normally, the peak secretion of melatonin in the body occurs at night, and secretion of melatonin facilitates sleeping. Accordingly, the secretion of melatonin is restrained during the day.

In the process of WELL Certification discussed earlier, Equivalent Melanopic Lux (hereinafter referred to as EML) is introduced to evaluate whether or not lighting has a circadian-effective design. The EML can be obtained using the formula (1) below.

$$EML = \text{Illuminance[lx]} \times \text{Melanopic Ratio} \qquad (1)$$

The melanopic ratio (hereinafter referred to as MR) in formula (1) can be obtained by the formula (2) below.

$$\text{Melanopic Ratio} = \frac{\sum_{730}^{380} \text{Light} \times \text{Circadian}}{\sum_{730}^{380} \text{Light} \times \text{Visual}} \times 1.218 \qquad (2)$$

Figure 1:
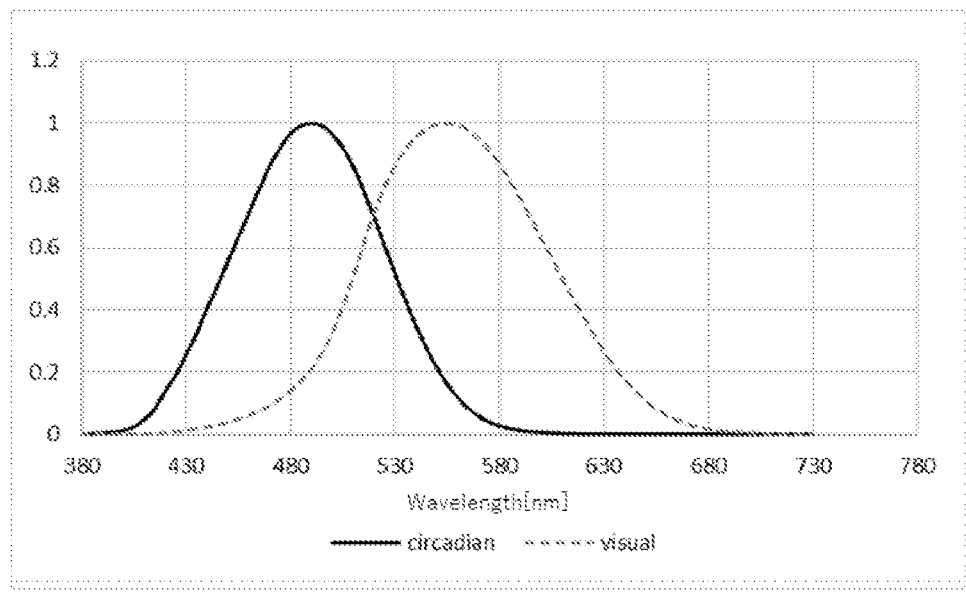
FIG. 1 is a diagram showing a circadian response curve and a visual sensitivity response curve.

The Light, the Circadian, and the Visual here refer to the spectral distribution of the light produced by a light fixture, the circadian response based on the spectral sensitivity characteristics of melanopsin having a peak in the vicinity of 480 nm to 490 nm, and the visual sensitivity response, respectively. FIG. 1 shows a circadian response curve and a visual sensitivity response curve.

As is understood from the formula (1), two approaches are available to increase the EML value: increase Illuminance or increase MR. Furthermore, MR apparently is more dependent on the circadian rhythm characteristics than Illuminance. Accordingly, it is preferable to focus on the MR value in addressing circadian rhythms. Based on the circadian responses, the emission intensity in the wavelength range of about 470 nm to about 490 nm is considered to particularly contribute to melatonin secretion control.

Certain embodiments of the present invention will be explained below with reference to the accompanying drawings. The embodiments explained below, however, are for giving shape to the technical ideas of the present invention, and are not intended to limit the present invention. In the explanation below, moreover, the same designations and reference numerals show the same members or those having similar characteristics, for which the explanation will be omitted as appropriate. The sizes and positional relationship of the members shown in the drawings might be exaggerated for clarity of explanation. The relationship between a color name and chromaticity coordinates, the relationship between a wavelength range and a color name of monochromatic light, and the like are in accordance with JIS Z8110.

First Embodiment

Figure 2:
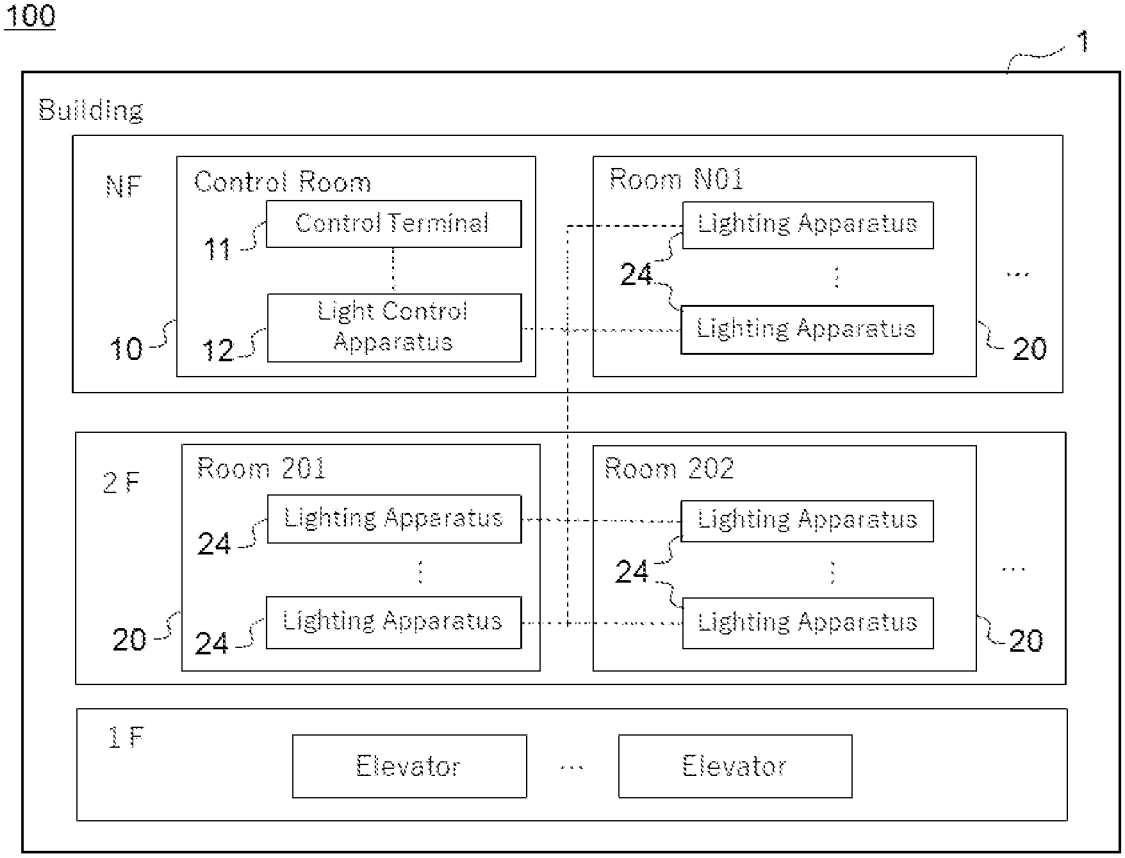
FIG. 2 is a system configuration diagram of an example of the lighting control system according to a first embodiment.

The lighting control system according to a first embodiment will be explained. FIG. 2 is a system configuration diagram for the lighting control system 100. A building 1 will be used as an example where lighting control by the lighting control system 100 is executed.

The building 1, for example, is an office building in which the employees of one or more companies work. An office building has multiple floors and the example shown in FIG. 2 represents an office building having N floors. In the building 1, a reception is provided on the first floor, and one can go to any floor using an elevator.

On the second and higher floors, multiple rooms/spaces C are provided, and a company can rent and use a desired room 20. Each floor has multiple rooms 20. Room numbers, for example, are assigned as identification information of each room 20. In the example shown in FIG. 2, room numbers 201 and 202 are assigned to the two rooms 20 on the second floor, and N01 is assigned to one office 20 on the Nth floor. Using the typical room number format described above, it is common to start a room number with the number that indicates the floor followed by a number to identify a specific room.

Figure 3:
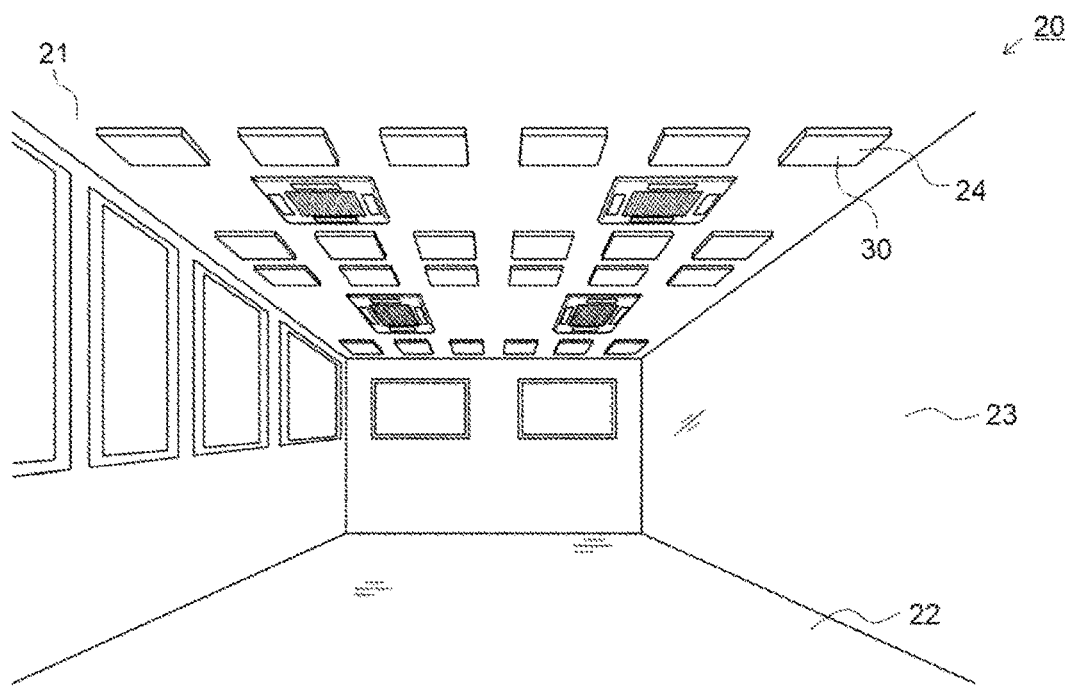
FIG. 3 is a schematic diagram of an example of the room structure in a building according to the first embodiment.

FIG. 3 is a diagram showing one example of a room 20 created in the building 1. The room 20 forms a space surrounded primarily by a ceiling 21, a floor 22, and walls 23. A door is provided in a portion of a wall 23 for the access to the room, and windows are provided in several locations to allow the outside air and light to enter the room. There may be a room without windows. Multiple lighting apparatuses 24 are installed on the ceiling 21 of the room 20. Moreover, air-conditioning equipment is disposed for adjusting the room temperature and humidity.

When a company uses a room, desks and chairs are further arranged in the room. The people who work in the room 20 (employees) are subjected to the illumination light provided by the lighting apparatuses 24 while they sit in the chairs and work at their desks. Accordingly, the lighting apparatuses 24 are arranged so as to provide illumination of at least a certain illuminance that is appropriate for working. For example, in the case of performing general office work, illumination light is irradiated such that the illuminance on an upper surface of the desk is at least 500 lx, more preferably at least 750 lx.

Such illuminance standards differ depending on the use of the building 1 and the type of work performed there. For example, the standards might differ among general office buildings, factories, schools, commercial facilities, and the like. Furthermore, the standards might differ depending on the country. Japan has standards known as JIS Z9110, for example.

Accordingly, "at least a certain illuminance" required of the lighting apparatus 24 installed on the ceiling 21 of the room 20 should be suitably determined based on the use of the building 1, the type of work performed there, and the standards established in the country where the building 1 is constructed. In this sense, the lighting control system 100 is a system that can control irradiation of illumination light having at least a certain illuminance in accordance with a work environment.

Furthermore, an office building is provided with a control room 10 for controlling the office building in addition to rooms 20 for rent to companies. In the control room 10, a system is installed for controlling building equipment, such as an elevator, air-conditioning system, lighting, and the like. Moreover, the control room 10 is equipped with a control terminal 11 and a lighting control apparatus 12. Although the control room 10 is located on the uppermost floor in the example shown in FIG. 2, it can be located on any given floor.

The broken lines in FIG. 2 show the connection between equipment for communication. In other words, the devices linked with the broken lines are communicably connected. The control terminal 11 and a plurality of lighting apparatuses 24 are communicably connected with the lighting control apparatus 12. The lighting control apparatus 12 is communicably connected to the lighting apparatuses 24 subject to control, and controls the lighting apparatuses 24 through communication. For a communicable connection, any known wired or wireless communication means can be used. The devices not linked by broken lines may be communicably connected. Moreover, it may be communicably connected to any device other than those shown in FIG. 2.

Figure 4:
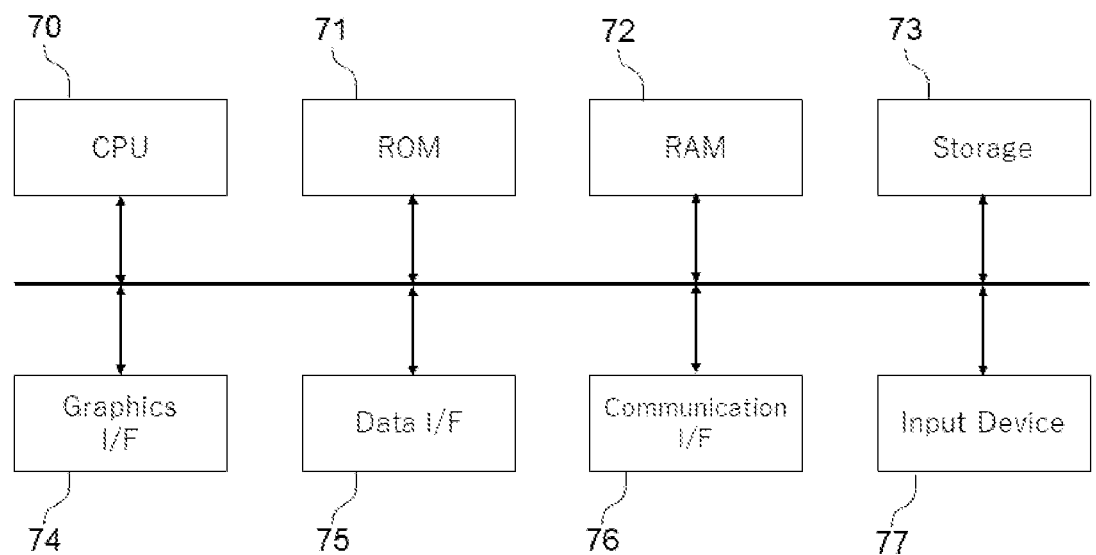
FIG. 4 is a block diagram explaining the hardware configuration of an information processing apparatus.

The control terminal 11 and the lighting control apparatus 12 can be constructed with an information processing apparatus. For example, the information processing apparatus is a computer or a server. FIG. 4 is a diagram showing one example of the hardware configuration of an information processing apparatus. In the information processing apparatus, a CPU 70, a ROM 71, a RAM 72, a storage 73, a graphics I/F 74, a data I/F 75, a communication I/F 76, and an input device 77 are connected to a bus.

The storage 73 can be a nonvolatile memory medium that can store data. For example, a hard disk drive, flash memory, or the like can be used. The CPU 70 is a processor that executes processing in accordance with a program stored in the ROM 71 and the storage 73 by using the RAM 72 as the working memory. The graphics I/F 74 is an interface that outputs the generated display control signals after being converted into signals displayable by the system.

The data I/F 75 is an interface for inputting external data. For example, an interface utilizing an USB or the like can be applied. The communication I/F 76 is an interface for communication with the network using a prescribed protocol. The input device 77 accepts a user input and outputs a prescribed control signal.

Figure 5:
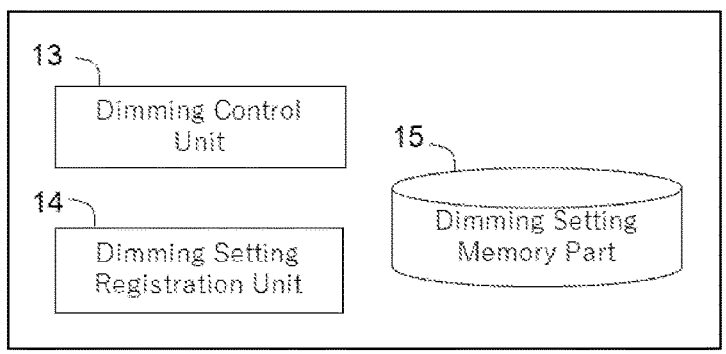
FIG. 5 is a block diagram explaining the software configuration of the lighting control apparatus according to the first embodiment.

FIG. 5 is a function block diagram explaining the information processing (function) executed by the lighting control apparatus 12. The function represented by each function block is achieved, for example, when the CPU 70 executes a program. The lighting control apparatus 12 includes a dimming control unit 13, a dimming setting registration unit 14, and a dimming setting memory part 15.

The dimming control unit 13 is configured to manage one or more lighting apparatuses 24 arranged in each of rooms 20 in the building 1 and controls lighting by the lighting apparatus 24. For example, it controls lighting of the room 20 based on the settings related to dimming control (dimming settings).

The dimming setting registration unit 14 is configured to register dimming settings. The dimming setting memory part 15 stores dimming setting information, which includes registered dimming settings. For example, when an office building administrator makes a registration request to the lighting control apparatus 12 by inputting dimming settings using the control terminal 11, the dimming setting registration unit 14 of the lighting control apparatus 12 registers the dimming settings in the dimming setting information in the dimming setting memory part 15 in accordance with the registration request.

Figure 6:
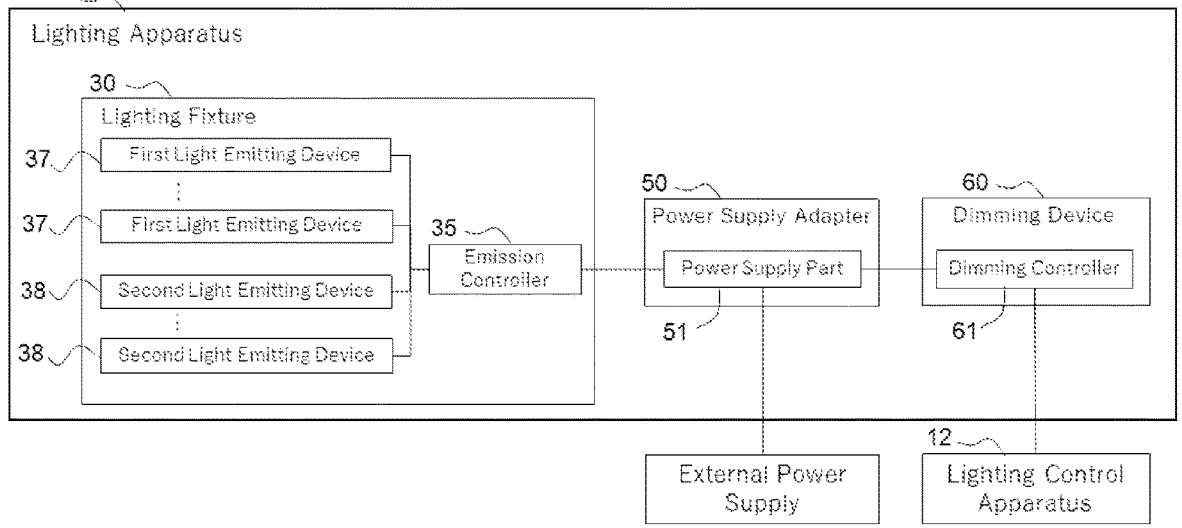
FIG. 6 is a schematic diagram explaining a lighting apparatus according to the first embodiment.

A lighting apparatus 24 includes a light fixture 30, a power source adaptor 50, and a dimming driver 60. FIG. 6 is a diagram showing one example of the lighting apparatus configuration and the connection between the lighting apparatus 24 and an external device.

As shown in FIG. 6, in the lighting apparatus 24, the light fixture 30 and the power supply adaptor 50 are connected, and the power supply adaptor 50 and the dimming driver 60 are connected. The light fixture 30 and the power supply adaptor 50 are connected by using an electrical wire, such as a DC harness. The power supply adaptor 50 and the dimming driver 60 are connected by using a communication wire such as a communication cable. In other words, the light fixture 30 and the power supply adaptor 50 are easily connected or disconnected by plugging or unplugging the electrical wire. Similarly, the power supply adaptor 50 and the dimming driver 60 are easily connected or disconnected by plugging or unplugging the connection wire.

The power supply adaptor 50 is connected to the wiring provided behind the ceiling of the building 1 and can receive a supply of power from an external power supply device. The dimming driver 60 is communicably connected to the lighting control apparatus 12 via a wired or wireless communication means. The light fixture 30 and the power supply adaptor 50 may be structured as an integral device. The power supply adaptor 50 and the dimming driver 60 may be structured as an integral device.

The power supply adaptor 50 includes a power supply unit 51 that supplies power from an external power supply device to the light fixtures 30. For example, the power supply unit 51 converts AC power from an external power supply device into DC power to be supplied to the light fixtures 30.

The dimming driver 60 includes a dimming controller 61 that adjusts the light emitted by a light fixture 30. It also installs a driver program for controlling the light from a light fixture 30. Accordingly, the dimming driver 60 is provided with an information processing mechanism for executing a driver program. It includes, for example, a CPU, ROM, RAM, or the like. The dimming controller 61 receives from the communicably connected lighting control apparatus 12 a dimming instruction, which includes the information for lighting control, and controls the light from a light fixture 30 based on the dimming instruction.

The light fixture 30 includes a base plate 31, a substrate 32, a plurality of light emitting devices 36, an emission controller 35, a cover 33, and a fixing member 34. The plurality of the light emitting devices 36 include one or more first light emitting devices 37 and one or more second light emitting devices 38. The light emitting device 36 includes a light emitting element 39, a wavelength conversion member 40, and a molded part 42.

Figure 7:
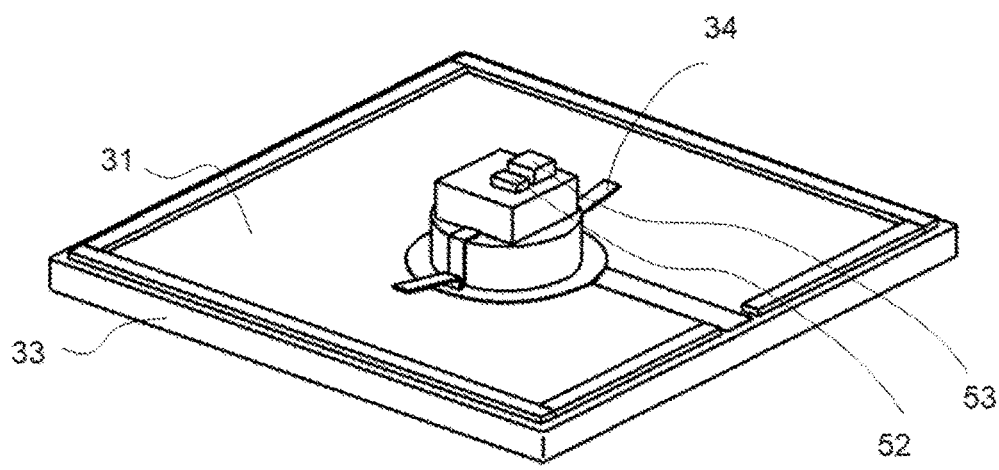
FIG. 7 is a perspective view of a light fixture with a power adaptor according to the first embodiment.
Figure 8:
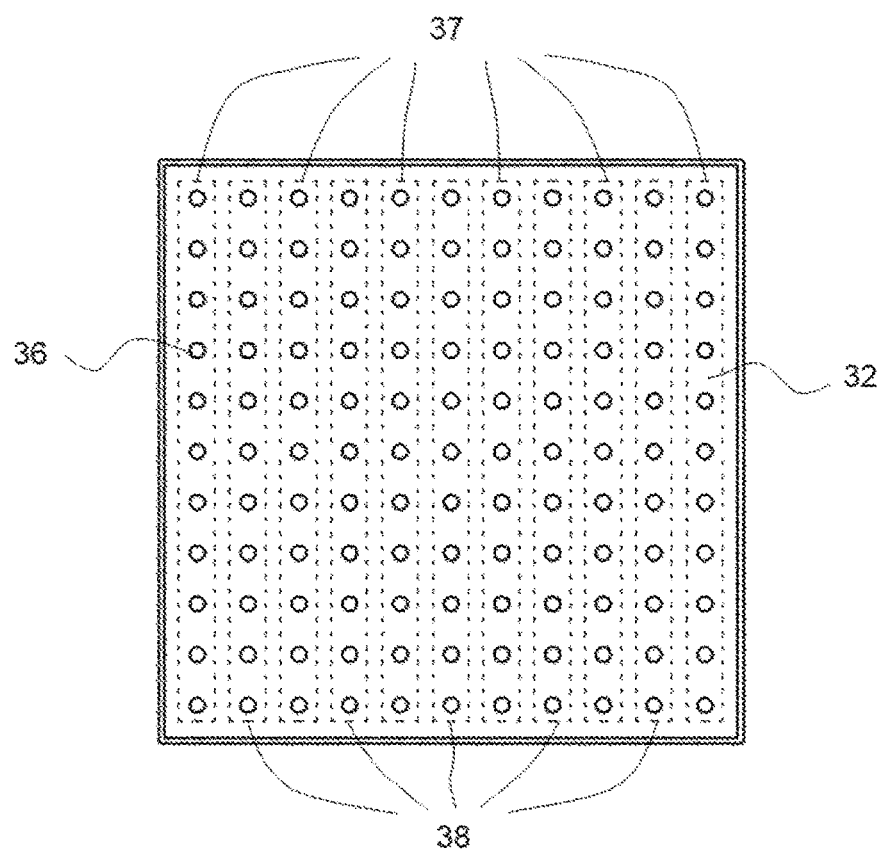
FIG. 8 is a plan view explaining the emission face of a light fixture according to the first embodiment.
Figure 9:
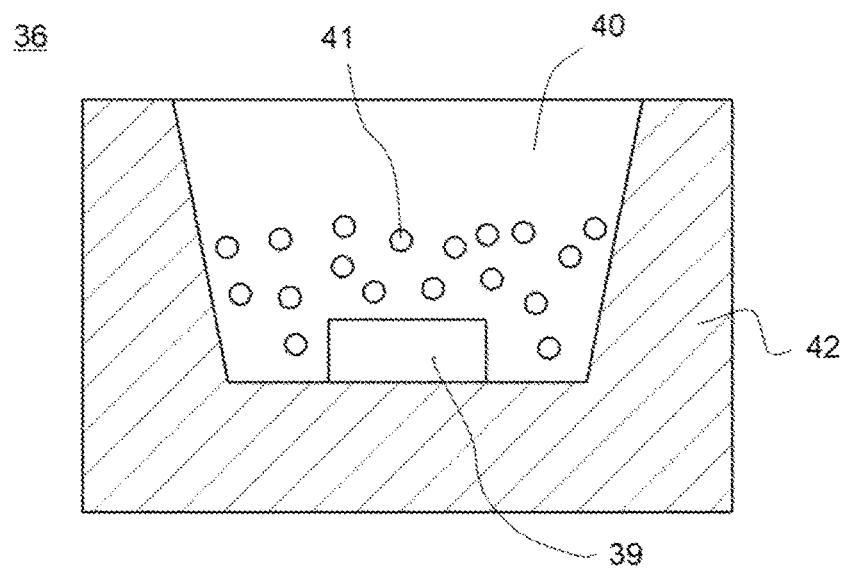
FIG. 9 is a schematic diagram of a light emitting device according to the first embodiment.

FIG. 7 is a perspective view of the light fixture 30 equipped with the power supply adaptor 50 when viewed from the ceiling installation face of the light fixture 30. FIG. 8 is a diagram showing the emission face (the face opposite the ceiling installation face) of the light fixture 30. In FIG. 8, the light fixture 30 is shown without the cover 33. FIG. 9 is a schematic cross-sectional view of a light emitting device 36 included in the light fixture 30.

In the light fixture 30, the substrate 32 is attached to the base plate 31. Multiple light emitting devices 36 are mounted on the substrate 32. The light emitting devices 36 are electrically connected via wiring, and power is supplied to the light emitting devices 36 via the emission controller 35 which controls the emission of the light emitting devices 36.

Furthermore, the cover 33 is attached to the base plate 31 so as to surround the light emitting devices 36 arranged on the substrate 32. The fixing member 34 is provided on the ceiling installation surface, i.e., the face of the base plate 31 opposite the face on which the light emitting devices 36 are disposed. The light fixture 30 and the power supply adaptor 50 are connected on the ceiling installation surface side. The power supply adaptor 50 is equipped with a power supply terminal for connection with the external power supply device described above, and a dimming terminal for connection with the dimming driver 60.

In the light fixture 30, the first light emitting devices 37 and the second light emitting devices 38 are alternately arranged. In the example shown in FIG. 8, multiple light emitting devices 36 are arranged in rows and columns, where the first light emitting devices 37 and the second light emitting devices 38 are arranged in alternating rows (or columns). They may be alternated in different units other than rows or columns. For example, they may be alternated in units of a single or multiple light emitting devices.

The light emitted from the first light emitting devices 37 has a different emission spectrum from that of the light emitted from the second light emitting devices 38. This can be achieved, for example, by varying the types and/or the contents of the phosphors 41 contained in the wavelength conversion member 40. This can alternatively be achieved by employing in the first light emitting devices 37 light emitting elements 39 that emit light having a different emission spectrum from that of the light emitted by light emitting elements 39 used in the second light emitting devices 38. Both the light emitting elements 39 and the phosphors 41 may be varied.

In a light fixture 30, the emission controller 35 can individually control the light emission by the first light emitting devices 37 and the light emission by the second light emitting devices 38. For example, it can allow only the first light emitting devices 37 or the second light emitting devices 38 to emit light. Moreover, it can adjust the emission intensity of each of the first light emitting devices 37 and the second light emitting devices 38. The form of a light fixture 30 and the form of a light emitting device 36 are not limited to those shown in the drawings, and any known shape, structure, or construction can be utilized.

Here, the emission spectra of a light emitting devices 36 employed in the lighting control system 100 according to the first embodiment will be explained. A light fixture 30 can be produced by selecting for first light emitting devices 37 and second light emitting devices 38 light emitting devices that emit light having different emission spectra described below as examples. The examples below are some of those that can be employed in the light fixture 30, and in applying the present invention, the light emitting devices do not have to be limited to those described below.

Light Emitting Device Example 1

Figure 10A:
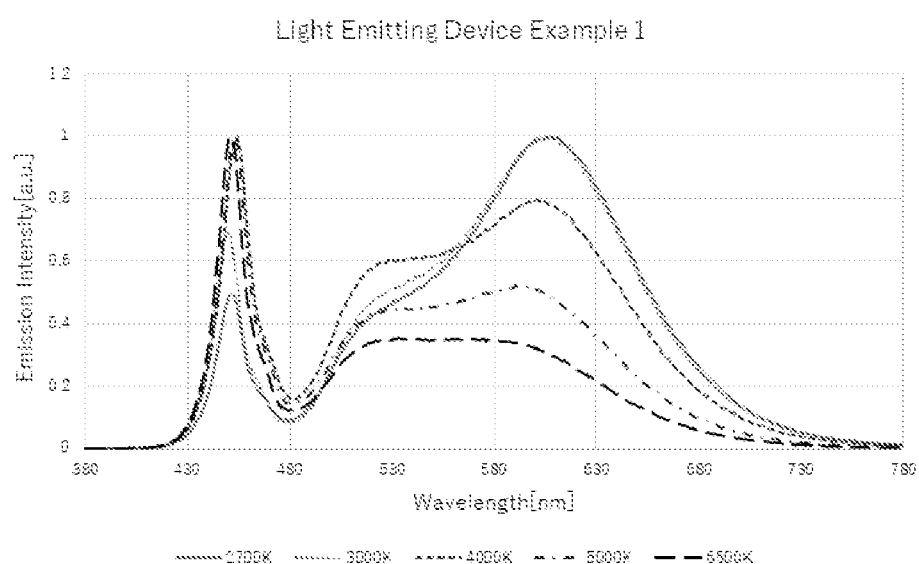
FIG. 10A shows examples of emission spectra of a light emitting device employed in a light fixture according to the first embodiment.

The light emitting device 36 of example 1 includes a light emitting element 39 having a peak emission wavelength in the range of 410 nm to 490 nm, and a wavelength conversion member 40 containing a rare earth aluminate phosphor represented by the formula, $(Y,Gd,Tb,Lu)_3(Al,Ga)_5O_{12}$:Ce, and a silicon nitride phosphor represented by the formula, $(Ca,Sr)AlSiN_3$:Eu. FIG. 10A shows multiple emission spectra achieved by varying the correlated color temperature values at a chromaticity near the black body radiation locus by adjusting the contents of the phosphors 41. The light emitting device 36 of example 1 can achieve emission efficiency ranging from 180 lm/W to 210 lm/W and an average of rendering index ranging from 80, but under 90.

Here, a chromaticity near the black body radiation locus refers to light having a color deviation, duv, of plus or minus 0.02 from the black body radiation locus measured in accordance with JIS Z8725. In the description herein, the multiple elements included in any phosphor composition formula using commas mean that at least one of these elements is contained in the composition, and a combination of two or more of the elements may be contained. In the description herein, moreover, what precedes the colon in any phosphor composition formula represents the molar ratio of the elements making up the host crystal, and what follows the colon represents the activator.

Light Emitting Device Example 2

Figure 10B:
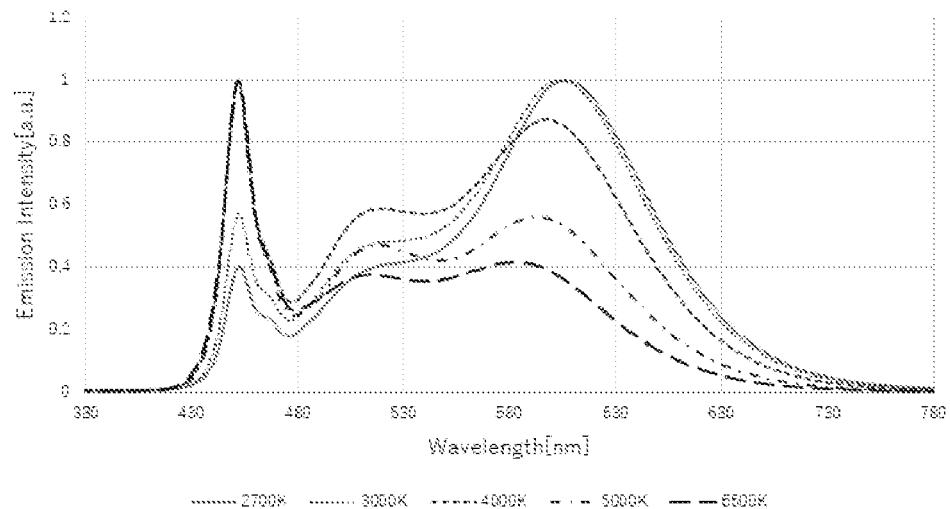
FIG. 10B shows examples of emission spectra of a light emitting device employed in a light fixture according to the first embodiment.

The light emitting device 36 of example 2 includes a light emitting element 39 having a peak emission wavelength in the range of 410 nm to 490 nm, and a wavelength conversion member 40 containing an alkaline earth metal aluminate phosphor represented by the formula, $Sr_4Al_{14}O_{25}$:Eu. FIG. 10B shows multiple emission spectra achieved by varying the correlated color temperature values at a chromaticity near the black body radiation locus by adjusting the content of the phosphor 41. The light emitting device 36 of Example 2 can achieve emission efficiency ranging from 170 lm/W to 195 lm/W and an average of rendering index ranging from 80 to 90.

Light Emitting Device Example 3

Figure 10C:
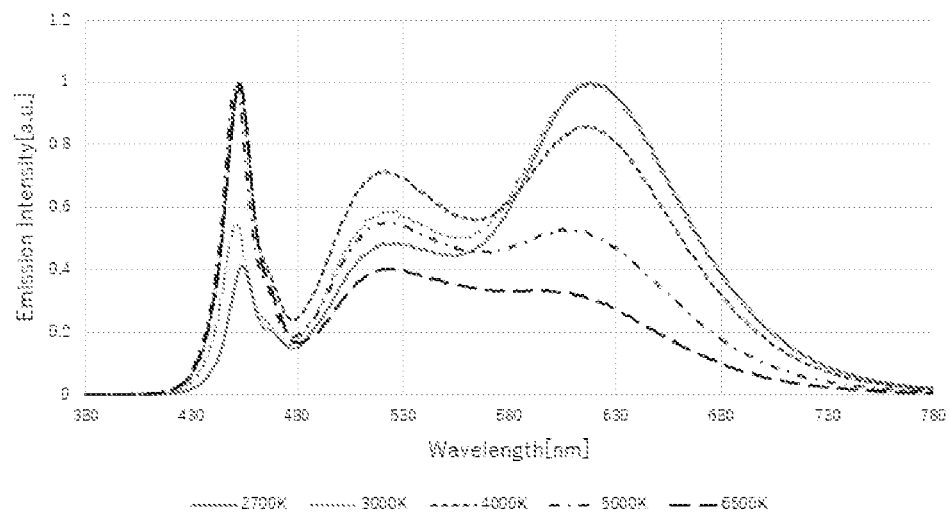
FIG. 10C shows examples of emission spectra of a light emitting device employed in a light fixture according to the first embodiment.

The light emitting device 36 of example 3 includes a light emitting element 39 having a peak emission wavelength in the range of 410 nm to 490 nm, and a wavelength conversion member 40 containing a silicate phosphor represented by the formula, $(Ca,Sr,Ba)_8MgSi_4O_{16}(F,Cl,Br)_2$:Eu. FIG. 10C shows multiple emission spectra achieved by varying the correlated color temperature values at a chromaticity near the black body radiation locus by adjusting the content of the phosphor 41. The light emitting device 36 of Example 3 can achieve emission efficiency ranging from 155 lm/W to 185 lm/W and an average of rendering index ranging from 90, but under 95.

Light Emitting Device Example 4

Figure 10D:
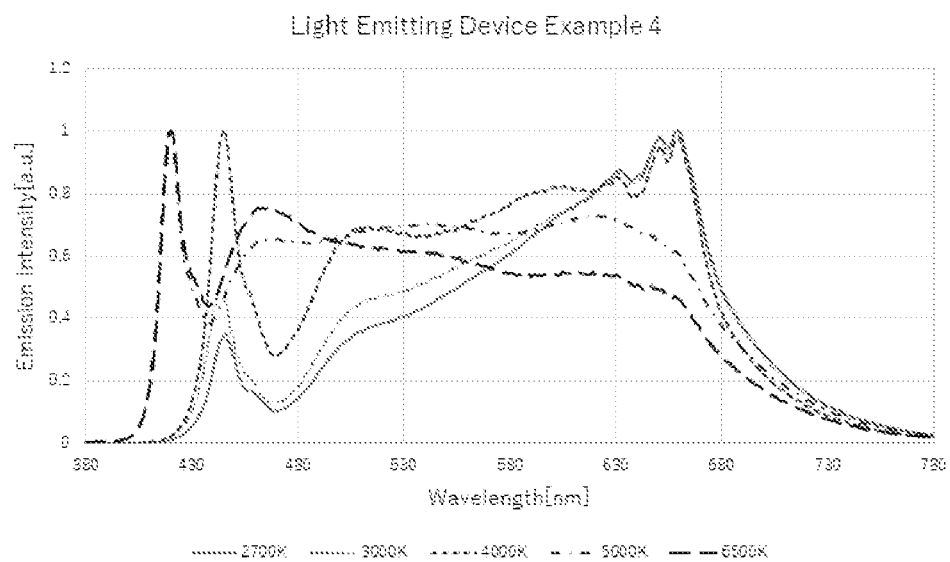
FIG. 10D shows examples of emission spectra of a light emitting device employed in a light fixture according to the first embodiment.

The light emitting device 36 of example 4 includes a light emitting element 39 having a peak emission wavelength in the range of 410 nm to 490 nm, and a wavelength conversion member 40 containing an alkaline earth phosphate phosphor represented by the formula, $(Ca,Sr,Ba)_5(PO_4)_3(Cl,Br)$:Eu and a fluorogermanate phosphor represented by the formula $3.5MgO.0.5MgF_2.GeO_2$:Mn. FIG. 10D shows multiple emission spectra achieved by varying the correlated color temperature values at a chromaticity near the black body radiation locus by adjusting the contents of the phosphors 41. The light emitting device 36 of Example 4 can achieve emission efficiency ranging from 115 lm/W to 140 lm/W and an average of rendering index ranging from 95, but under 100.

Light Emitting Device Example 5

Figure 10E:
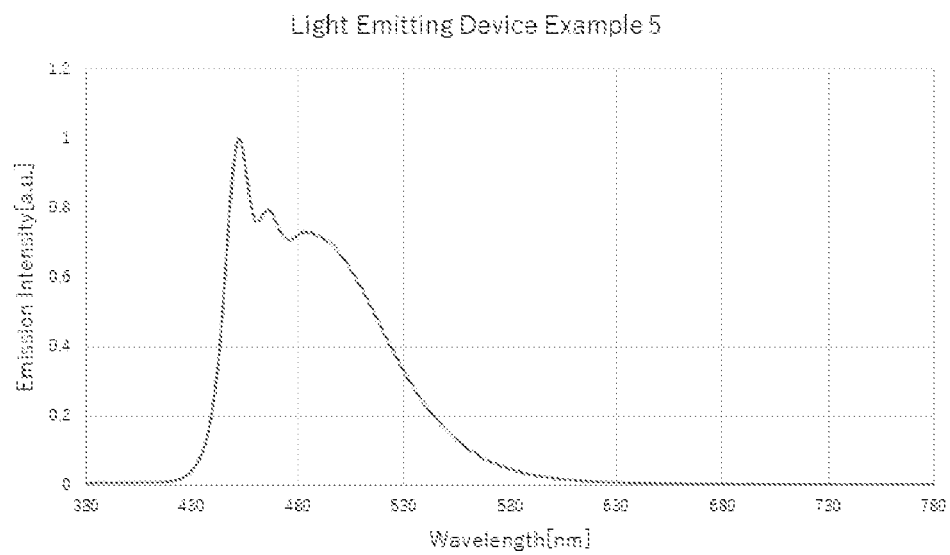
FIG. 10E shows examples of emission spectra of a light emitting device employed in a light fixture according to the first embodiment.

The light emitting device 36 of example 5 includes a light emitting element 39 having a peak emission wavelength in the range of 410 nm to 490 nm, and a wavelength conversion member 40 containing an alkaline earth metal aluminate phosphor represented by the formula, $Sr_4Al_{14}O_{25}$:Eu. FIG. 10E shows the emission spectrum of the light emitting device 36 of example 5. The light emitting device 36 of example 5 is a light emitting device with enhanced light intensity in the 470 nm to 490 nm range of the wavelength that shows a circadian-effective emission spectrum.

The light emitting device 36 emits light in the region in the CIE1931 color space chromaticity diagram defined by the first straight line connecting the first point whose x, y coordinates are (0.280, 0.070) and the second point whose x, y coordinates are (0.280, 0.500), the second straight line connecting the second point and the third point whose x, y coordinates are (0.013, 0.500), the pure purple locus extending from the first point towards smaller x values, and the spectral locus extending from the third point in towards smaller y values. Since this light is of the chromaticity distant from the black body radiation locus, illumination light is created by color toning with other light emitting devices.

The light emitting device 36 of example 5 has an MR value of at least 2.0. The percentage of the light intensity in the 470 nm to 490 nm range relative to the light intensity across the entire emission spectrum is at least 15%. It can achieve an emission efficiency ranging from 115 lm/W to 140 lm/W.

The emission spectral characteristics of these light emitting device examples 1 to 5 can be identified based on FIGS. 10A to 10E. For example, the wavelength range having a peak wavelength, the full width at half maximum, and the like can be identified using the drawings.

Lighting Control

Figures 11, 12:
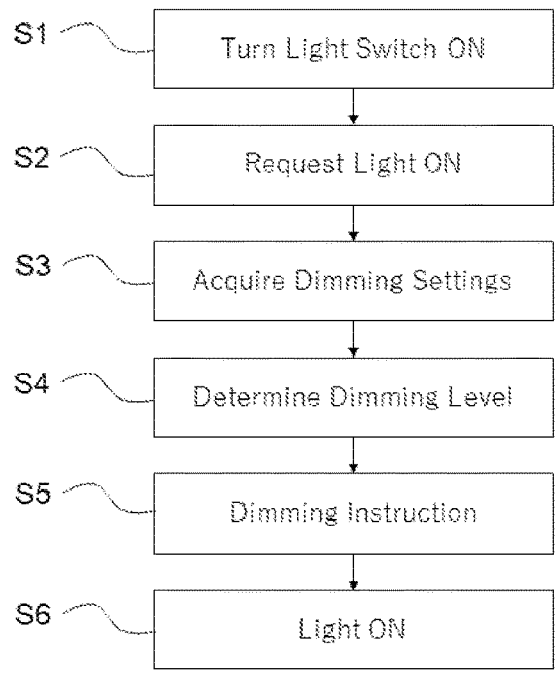
FIG. 11 is a flowchart showing the flow of a lighting control executed by the lighting control system according to the first embodiment.
FIG. 12 is an example of the data structure for the dimming setting information according to the first embodiment.

Lighting control performed by the lighting control system 100 will be explained next. FIG. 11 is a flowchart showing the flow of lighting control performed by the lighting control system 100. Each step in the sequence will be described below.

In step S1, the light switch is turned on. The switch is used by, for example, an employee of a company who first arrives at the room 20 on that day. Alternatively, a computer may be allowed to automatically turn the switch on by remote control. For example, in the case in which the entrance gates on the first floor of the office building require authorization using an IC card such as an employee ID card, it may be adapted such that an authorization of an employee using the IC card turns on the light switch for the office space of the company of the employee.

In step S2, the lighting control apparatus 12 receives a lighting request, which is a signal that requests that the lights be turned on. The lighting request includes light specifying information that specifies one or more target lighting apparatuses 24 subject to ON/OFF control by the light switch. For example, room numbers can be used for the light specifying information. In this case, the lighting apparatus 24 will be controlled per room. In the case of a large room 20, the room 20 may be divided into two or more areas to be used as the units of control.

In step S3, the dimming control unit 13 of the lighting control apparatus 12 acquires dimming settings from the dimming setting information stored in the dimming setting memory part 15. Based on the light specifying information included in the received lighting request and the dimming setting information stored in the dimming setting memory part 15, the dimming control unit 13 acquires dimming settings associated with the light specifying information.

FIG. 12 is a diagram showing one example of the data structure of the dimming setting information stored in the dimming setting memory part 15. The dimming setting information in this example is tenant information 16 set in units of companies that rent rooms 20, in other words, in units of tenants occupying one or multiple rooms 20 of the building 1.

The tenant information 16 includes a tenant identification code, floor, room, and basic business hours in accordance with each tenant are registered. The information item "tenant identification code" is the information used to identify a company renting a room 20, i.e., a tenant under a rental agreement. The floor on which the room 20 rented by the tenant is registered in the information item "floor." The room number assigned to the room 20 rented by the tenant is registered in the information item "room." That is, light specifying information is registered in the tenant information 16.

A time period selected by the tenant is registered in the information item "the basic business hours." Each tenant can suitably determine this, but the start time to the end time based on the type of business is typically registered as basic business hours. It is generally assumed that the start time is set between 07:00 and 10:30, and the end time is set between 16:00 and 19:00.

As shown in FIG. 12, moreover, a company renting two or more rooms can register different basic business hours depending on the room. In the case in which a company turns off the lights during a lunch break, the company can register the lunch hour. The dimming control unit 13 of the lighting control apparatus 12 acquires from the tenant information 16 the dimming settings associated with the light specifying information included in the lighting request.

FIG. 13A to FIG. 13E are diagrams explaining examples of the dimming setting information stored in the dimming setting memory part 15. The dimming setting information in these examples represents dimming rule information 17 that specifies how lighting is controlled in a daily cycle.

The dimming rule information 17 defines, for example, the degree of circadian characteristics in accordance with the time or time period such that the circadian characteristics change in accordance with time. In the case of performing color toning, the correlated color temperatures may be specified in accordance with time. FIG. 13A to FIG. 13D show dimming rule examples specifying circadian characteristics in accordance with time, and FIG. 13E shows a dimming rule example specifying correlated color temperatures in accordance with time.

In a light fixture 30, changing the irradiation percentages of the light from the first light emitting devices 37 and the light from the second light emitting devices 38 can change the circadian characteristics or the correlated color temperatures of the lighting provided by a lighting apparatus 24. In other words, the dimming rule information defines the rules for changing the irradiation percentages of the light from the first light emitting devices 37 and the light from the second light emitting devices 38 of a light fixture 30 in accordance of the time periods in one day.

Figure 13A:
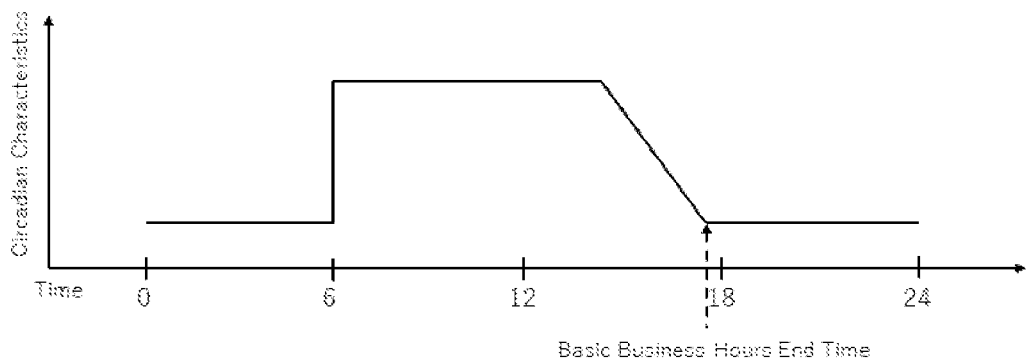
FIG. 13A is a schematic diagram explaining one example of dimming rules according to the first embodiment.

In the example shown in FIG. 13A (Dimming Rules 1), from 00:00 to 06:00 the circadian characteristic value is the minimum value of the day, which changes to the maximum value at 06:00. Subsequently, the maximum value is maintained until 15:30, and from 15:30 to the end time of the basic business hours, the circadian characteristic value decreases with the passage of time. It becomes the minimum value past the end time until 24:00.

In other words, it is specified by the Dimming Rules 1 that the circadian characteristic value is to increase at the prescribed time determined by the administrator of the building 1 (06:00). It is also specified that the circadian characteristic value is to begin decreasing at the prescribed time determined by the administrator of the building 1 (15:30). Moreover, it is specified that the circadian characteristic value begins to gradually decrease at the prescribed time determined by the administrator of the building 1 (15:30) until the prescribed time determined by a tenant (the end time of the basic business hours).

Figure 13B:
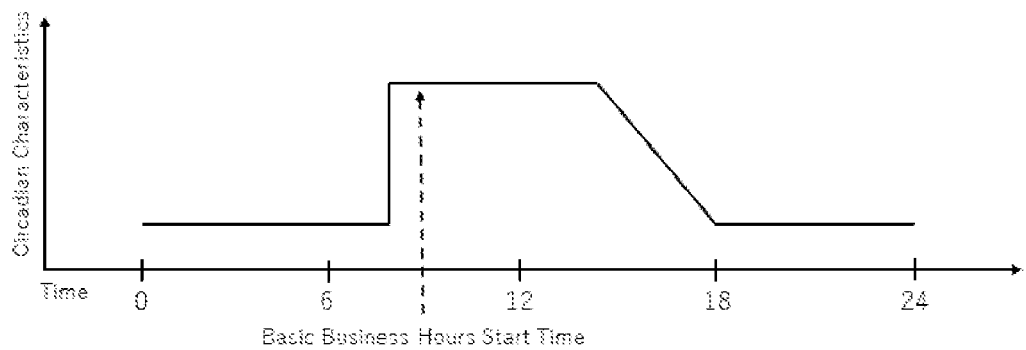
FIG. 13B is a schematic diagram explaining one example of dimming rules according to the first embodiment.

In the example shown in FIG. 13B (Dimming Rules 2), from 00:00 to one hour before the start time of the basic business hours the circadian characteristic value is the minimum value of the day, which changes to the maximum value at one hour before the start time. Subsequently, the maximum value is maintained until 15:30, and from 15:30 to 18:00 the circadian characteristic value decreases with the passage of time. It becomes the minimum value past 18:00 until 24:00.

In other words, it is specified by the Dimming Rules 2 that the circadian characteristic value is to increase at the prescribed time determined by a tenant (the start time of the basic business hours). It is also specified that the circadian characteristic value is to begin decreasing at a prescribed time determined by the administrator of the building 1 (15:30). Moreover, it is specified that the circadian characteristic value is to gradually decrease during the prescribed time period determined by the administrator of the building 1 (from 15:30 to 18:00). Moreover, it is specified that the time to increase the circadian characteristic value is decided based on the prescribed time determined (the start time of the basic business hours) and the preset conditions (one hour before the start time) by a tenant.

Figure 13C:
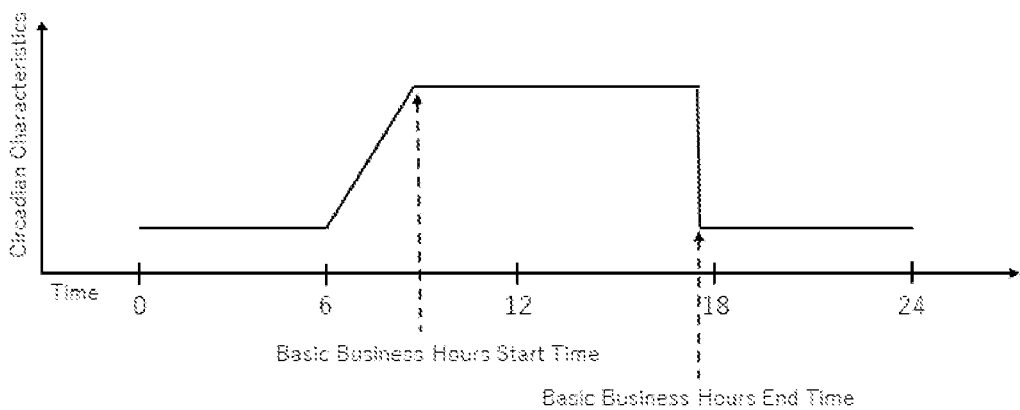
FIG. 13C is a schematic diagram explaining one example of dimming rules according to the first embodiment.

In the example shown in FIG. 13C (Dimming Rules 3), from 00:00 to 06:00 the circadian characteristic value is the minimum value of the day, and from 06:00 to the start time of the basic business hours the circadian characteristic value increases with the passage of time. Subsequently, the maximum value is maintained from the start time to the end time, which changes to the minimum value at the end time. Past the end time, it is maintained at the minimum value until 24:00.

In other words, it is specified by the Dimming Rules 3 that the circadian characteristic value is to begin increasing at the prescribed time determined by the administrator of the building 1 (06:00). It is also specified that the circadian characteristic value begins decreasing at the prescribed time determined by a tenant (the end time of the basic business hours). Furthermore, it is specified that the circadian characteristic value begins gradually increasing at the prescribed time determined by the administrator of the building 1 (06:00) until the prescribed time determined by a tenant (the start time of the basic business hours).

Figure 13D:
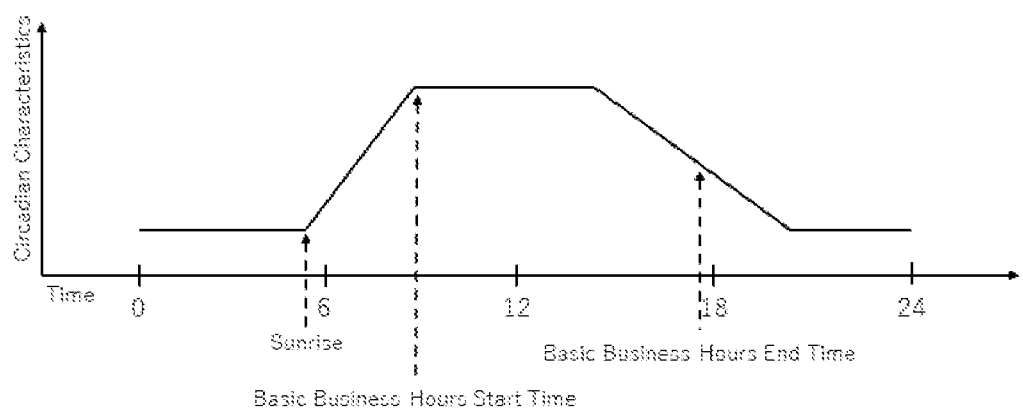
FIG. 13D is a schematic diagram explaining one example of dimming rules according to the first embodiment.
Figure 13E:
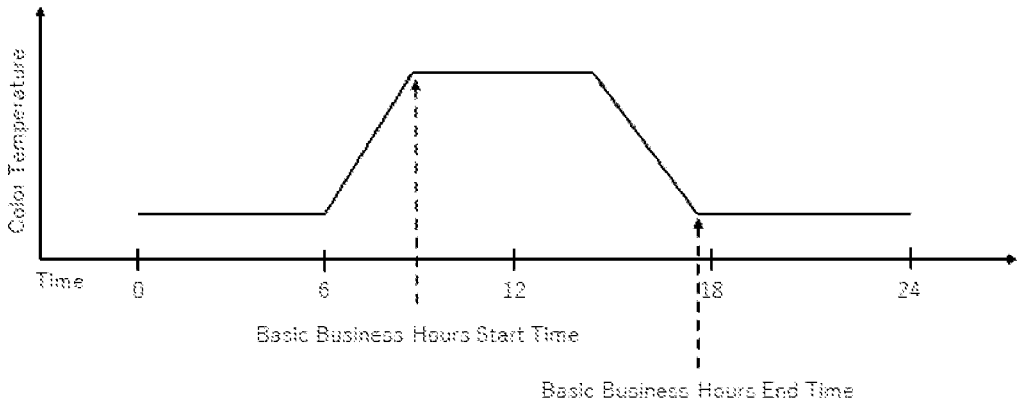
FIG. 13E is a schematic diagram explaining one example of dimming rules according to the first embodiment.

In the example shown in FIG. 13D (Dimming Rules 4), from 00:00 to the sunrise time (sunrise time) the circadian characteristic value is the minimum value of the day, and from the sunrise time to the start time of the basic business hours the circadian characteristic value increases with the passage of time. Subsequently, the maximum value is maintained until 15:30, and from 15:30 to the end time of the basic business hours the circadian characteristic value is reduced with the passage of time. The circadian characteristic value does not reach the minimum value at the end time, instead the circadian characteristic value continues to decrease past the end time. It becomes the minimum value at 20:00, which is maintained until 24:00.

In other words, it is specified by the Dimming Rules 4 that the time to increase the circadian characteristic value is decided based on the natural environmental information (sunrise time). A sunrise time can be set based on the statistical data in the region where the lighting control system 100 is installed. Dimming rules may be set to reduce the circadian characteristic value in line with sunset based on a sunset time. Alternatively, dimming rules may be set such that the circadian characteristic value becomes minimum from sunset to sunrise.

It is specified by the Dimming Rules 4 that the circadian characteristic value begins decreasing at a prescribed time determined by the tenant (the end time of the basic business hours) to a prescribed percentage of the maximum value (e.g., 50%) with the passage of time. It is further specified that subsequently the circadian characteristic value decreases with the passage of time until a prescribed time determined by the administrator of the building 1 (20:00).

In the example shown in FIG. 13E (Dimming Rules 5), from 00:00 to 06:00 the correlated color temperature is the minimum value of the day, and from 06:00 to the start time of the basic business hours the correlated color temperature increases with the passage of time. Subsequently, the maximum value is maintained from the start time to 15:30, and from 15:30 to the end time of the basic business hours the correlated color temperature decreases with the passage of time. Past the end time, the minimum value is maintained until 24:00.

In other words, it is specified by the Dimming Rules 5 that the correlated color temperature is to begin increasing at a prescribed time determined by the administrator of the building 1 (06:00). It is also specified that the correlated color temperature is to begin decreasing at a prescribed time determined by the administrator of the building 1 (15:30). It is specified that the correlated color temperature is gradually increased or reduced.

As described above, dimming rules define how the circadian characteristic value of the light produced by the lighting apparatuses 24 changes during the day. The circadian characteristic value can be changed by changing the irradiation percentages of the light from the first light emitting devices 37 and the light from the second light emitting devices 38 of a light fixture 30.

It is preferable for the dimming rules to specify that the melanopic ratio of the illumination light at 10:00 is higher than the circadian characteristic value of the illumination light at 17:00. It is preferable to specify that the difference between the maximum and minimum circadian characteristic values from 10:00 to 12:00 is smaller than the difference between the maximum and minimum circadian characteristic values from 14:00 to 18:00. It is preferable to specify that the average circadian characteristic value from 10:00 to 12:00 is higher than the average circadian characteristic value from 16:00 to 18:00.

Dimming rules are not limited to those described in these examples, and can be established by combining the elements disclosed in the examples. Furthermore, dimming rules may be created by incorporating elements other than those disclosed in the example. Dimming rules may be created for lunch breaks, for example.

Such dimming rules are designed to address the effects on the human body. Although the details will be described later, by appropriately selecting first light emitting devices 37 and second light emitting devices 38, lighting control addressing the effects on the human body can be performed even by the Dimming Rules 5, which specify correlated color temperatures. In the lighting control system 100, dimming rules address daily rhythms of humans of getting up in the morning and sleeping at night by establishing modes of lighting control such that the circadian characteristic value is high during active hours such as the morning and the afternoon, and the circadian characteristic value is lower in the evening and the night than the daytime. Creating dimming rules matching the business type of a tenant can facilitate healthy daily rhythms while increasing the intellectual productivity of employees during business hours.

The dimming control unit 13 of the lighting control apparatus 12 acquires such dimming rule information 17 from the dimming setting information stored in the dimming setting memory part 15. The dimming setting memory part 15 can simply store at least one set of registered dimming rules in the dimming rule information. In the case of one set of dimming rules, the rules will be uniformly applied to tenants.

A plural sets of dimming rules may be stored to allow a tenant to select applied dimming rules. It may alternatively be adapted to register customized dimming rules considering the business type of a tenant. In the case of applying dimming rules in accordance with tenants, for example, information specifying the dimming rules to be applied to each tenant is registered in the tenant information.

In step S4, the dimming control unit 13 of the lighting control apparatus 12 determines the dimming level at the current time based on the dimming setting information acquired. For example, based on the tenant information and the dimming rule information, it specifies the dimming level corresponding to the circadian characteristic or the correlated color temperature at the current time, and determines the irradiation percentage of the light from the first light emitting devices 37 and the irradiation percentage of the light from the second light emitting devices 38.

The irradiation percentages of the first light emitting devices 37 and the second light emitting devices 38 may be determined at the dimming driver 60. In other words, the lighting control apparatus 12 specifies the circadian characteristic or correlated color temperature value (dimming level) and sends the value (dimming level) to the dimming driver 60. Then the irradiation percentages can be determined at the dimming driver 60 in response to receiving the dimming level. The correspondence between circadian characteristic values and irradiation percentages of the light emitting devices 36 is managed as the characteristic data of the light fixtures 30 by the lighting control system 100 (the lighting control apparatus 12 or the dimming driver 60).

Here, in the case in which the lighting control system 100 is used by a company in a building 1 such as an office building, illuminance of a certain value or higher suited for the work environment is maintained while the lights are on. In other words, when changing the circadian characteristics, the lighting control is performed so as not to excessively reduce the illuminance, which can impair employees' ability to work. In a general office building, light fixtures 30 irradiate illumination light such that the desktop illuminance is at least 500 lx, for example.

Furthermore, at least in the basic employee working hours, while the lights are on, the illuminance is controlled to be at a certain level or higher in accordance with the work environment. The basic employee working hours, for example, are from the start time or 09:00 to the end time or 18:00, excluding lunch breaks, without limiting the working hours. For example, countries that have daylight savings time might have earlier working hours.

In step S5, the dimming control unit 13 of the lighting control apparatus 12 transmits dimming instructions to one or more lighting apparatuses 24 such that lighting by the lighting apparatus 24 is controlled to the decided dimming level. In the configuration shown in FIG. 6, the lighting control apparatus 12 transmits dimming instructions to the dimming driver 60 communicably connected thereto. Subsequently, the lighting control apparatus 12 periodically determines dimming levels and transmits dimming instructions until it receives a request to turn off the lights after the light switch is turned off. After receiving a request to turn off the lights, it transmits a turn off instruction to one or more lighting apparatuses 24.

In step S6, a lighting apparatus 24 that received a dimming instruction irradiates illumination light by controlling the irradiation percentages of the light from the first light emitting devices 37 and the light from the second light emitting devices 38 of the light fixture 30 in accordance with the received dimming instruction. The lights are now on. In the configuration shown in FIG. 6, the dimming controller 61 of the dimming driver 60 controls the emission controller 35 of a light fixture 30, and the emission controller 35 allows the first light emitting devices 37 and the second light emitting devices 38 to emit light at appropriate irradiation percentages in accordance with the control.

The dimming driver 60 may be adapted to store one or more dimming rules applicable to the light fixtures 30 subject to dimming control and execute the processing of steps S2 to S6. In this case, the lighting control apparatus 12 transmits dimming settings to an applicable dimming driver 60 when registration or updating of dimming setting information occurs in connection with a newly entered or renewed rental agreement, and the dimming driver 60 stores the dimming settings received. In the case in which dimming rules are based on the start time and the end time, the lighting control apparatus 12 transmits dimming settings, which include dimming rules and condition parameters (start time or end time).

As described above, the lighting control system 100 performs dimming in accordance with the hours based on the dimming rules while lights are on.

Next, various cases will be explained in which light emitting devices for use as the first light emitting devices 37 and the second light emitting devices 38 in the lighting control system 100 are selected from among the light emitting device examples 1 to 5 and subjected to dimming control performed based on the dimming rules discussed above. The cases in which color toning control is performed and the cases in which the color toning control is not performed will be separately explained.

In cases of not performing color toning control, light emitting devices that emit light having the same correlated color temperature can be employed for the first light emitting devices 37 and the second light emitting devices 38. Accordingly, in these cases the light emitting device example 5 is not employed for any of the first light emitting devices 37 and the second light emitting devices 38. For example, in an office building, a light fixture 30 emitting daylight color or neutral white light is often employed. In terms of correlated color temperatures in the CIE1931 color space chromaticity diagram, a light emitting device emitting light in the 3000K to 7000K range is often employed.

The two light emitting devices having the same correlated color temperature here are not limited to those cases where they have strictly the same correlated color temperature value. This can have a correlated color temperature range recognized as the same color range in the field of lighting, for example, both having daylight colors, neutral white colors, or incandescent lamp colors. Moreover, correlated color temperatures in the range of 5000K to 6000K, from 3500K to 4500K, or from 2000K to 3000K, may be considered as the same correlated color temperatures. However, the correlated color temperature difference between the light from a first light emitting device 37 and the light from a second light emitting device 38 is preferably ±500K at most, more preferably ±100K at most.

Furthermore, the allowable range of difference for higher correlated color temperatures may be greater than the allowable range of difference for lower correlated color temperatures. For example, in the case of aligning the two light emitting devices at a correlated color temperature higher than 6500K, the difference is preferably within ±500K. Accordingly, in the case of aligning at 6500K, the variation ranging from 7000K to 6000K is allowed as the same correlated color temperature. In the case of aligning at any temperature in the 5000K to 5750K range, the variation preferably falls within ±250K. In the case of aligning at any temperature in the 3400K to 4600K range, the variation preferably falls within ±150K. In the case of aligning at any temperatures in the 2700K to 3150K range, the variation preferably falls within ±100K.

Table 1 summarizes the circadian characteristics in the cases of selecting for the first light emitting devices 37 and the second light emitting devices 38 various light emitting devices from examples 1 to 4 and performing dimming control based on dimming rules. Here, for the circadian characteristics, MR (melanopic ratio) and the percentage of the light intensity in the 470 nm to 490 nm range relative to the light intensity of the entire emission spectrum, were obtained. They are respectively labeled as Circadian Characteristic 1 and Circadian Characteristic 2 in the table.

TABLE 1

| Examples | First Light Emitting Device | Correlated Color Temperature/ Chromaticity | Second Light Emitting Device | Correlated Color Temperature/ Chromaticity | Circadian Characteristic 1 | | Circadian Characteristic 2 | |
|---|---|---|---|---|---|---|---|---|
| | | | | | Highest | Lowest | Highest | Lowest |
| Example 1-1 | Example 3 | 3000 K | Example 1 | 3000 K | 0.589 | 0.471 | 2.63% | 1.41% |
| Example 1-2 | Example 2 | 3000 K | Example 4 | 3000 K | 0.572 | 0.561 | 3.77% | 2.56% |
| Example 1-3 | Example 2 | 3000 K | Example 1 | 3000 K | 0.572 | 0.471 | 3.77% | 1.41% |
| Example 1-4 | Example 3 | 3000 K | Example 4 | 3000 K | 0.589 | 0.561 | 2.63% | 2.56% |
| Example 2-1 | Example 4 | 5000 K | Example 1 | 5000 K | 0.934 | 0.799 | 7.03% | 3.63% |
| Example 2-2 | Example 2 | 5000 K | Example 3 | 5000 K | 0.886 | 0.852 | 5.37% | 3.87% |
| Example 2-3 | Example 2 | 5000 K | Example 1 | 5000 K | 0.886 | 0.799 | 5.37% | 3.63% |
| Example 2-4 | Example 3 | 5000 K | Example 1 | 5000 K | 0.852 | 0.799 | 3.87% | 3.63% |
| Example 3-1 | Example 4 | 6500 K | Example 1 | 6500 K | 1.116 | 0.948 | 8.66% | 3.92% |
| Example 3-2 | Example 2 | 6500 K | Example 3 | 6500 K | 1.046 | 1.015 | 6.85% | 4.76% |
| Example 3-3 | Example 2 | 6500 K | Example 1 | 6500 K | 1.046 | 0.948 | 6.85% | 3.92% |
| Example 3-4 | Example 3 | 6500 K | Example 1 | 6500 K | 1.015 | 0.948 | 4.76% | 3.92% |

By irradiating illumination light while allowing only the light emitting devices having a higher circadian characteristic value between the first light emitting devices 37 and the second light emitting devices 38 to emit light, dimming control that maximizes circadian characteristics can be performed. On the other hand, by irradiating illumination light while allowing only the light emitting devices having a lower circadian characteristic value between the first light emitting devices 37 and the second light emitting devices 38 to emit light, dimming control that minimizes circadian characteristics can be performed. In Table 1, light emitting devices having higher circadian characteristic values are entered as the first light emitting devices 37 and light emitting devices having lower circadian characteristic values are entered as the second light emitting devices 38.

The control for achieving the maximum or minimum circadian characteristic value does not necessarily have to take the form of allowing only the first light emitting devices 37 or the second light emitting devices 38 to emit light. By adjusting the emission percentages of the first light emitting devices 37 and the second light emitting devices 38, the maximum and the minimum circadian characteristic values specified by the dimming rules can be achieved.

As is understood from Table 1, in the case of any lighting control system 100 controlling lighting by the lighting apparatuses 24 at the same correlated color temperature, a difference of 0.010 or greater can be achieved between the maximum and the minimum values of the circadian characteristic 1 in the daily cycle. Furthermore, the difference can be 0.165 or greater.

A difference of 0.05% or greater can be achieved between the maximum and the minimum values of the circadian characteristic 2 in the daily cycle. Furthermore, the difference can be 4.70% or greater.

The control ranges for the circadian characteristic 1 and the circadian characteristic 2 for other correlated color temperatures can similarly be derived from what is disclosed in Table 1. Furthermore, comprehensive controls can be performed by combining Table 1 with the emission efficiency and the average color rendering indices of the light emitting device examples 1 to 4.

For example, Examples 1-3, 2-3, and 3-3 in Table 1 show the results of selecting from among the light emitting device examples 1-4 two light emitting devices having good emission efficiency. The results show that the difference between the maximum and the minimum values of the circadian characteristic 1 can be 0.085 or greater while maintaining emission efficiency of 170 lm/W or higher. Furthermore, the difference can be 0.100 or greater.

In the cases where the correlated color temperatures for the first light emitting devices 37 and the second light emitting devices 38 are 5000K and 6500K, the examples having the largest difference between the maximum and minimum values of the circadian characteristic 1 and the examples having the largest difference between the maximum and the minimum values of the circadian characteristic 2 are common. Specifically, Example 2-1 and Example 3-1 are the examples having the largest differences in both characteristic values.

Circadian characteristic 1 is an assessed value corresponding to a circadian response, and circadian characteristic 2 is an assessed value corresponding to a melanopic peak wavelength of 470 nm to 490 nm. As is understood from the circadian responses shown in FIG. 1, circadian characteristic 1 is affected by the emission spectra outside the 470 nm to 490 nm wavelength range.

By using a light fixture 30 having a large difference in circadian characteristic 1 and a large difference in circadian characteristic 2, a lighting control system 100 with good circadian responses and good melatonin secretion controls can be achieved.

In the case of performing color toning controls, light emitting devices that emit light having different correlated color temperatures can be used for the first light emitting devices 37 and the second light emitting deices 38. Toning ranges, for example, can be from 2700K to 6500K, from 3000K to 5000K, or the like. In other words, a light fixture 30 that can be toned to range from incandescent lamp color to daylight or neutral white color is often employed.

In the case of performing color toning in sync with a circadian rhythm, a light emitting device having a higher circadian characteristic value is used for a first light emitting device 37 and a light emitting device having a lower circadian characteristic value is used for a second light emitting device 38 assuming that the first light emitting device 37 has a higher correlated color temperature and the second light emitting device 38 has a lower correlated color temperature. This is because daylight or neutral white light having a high correlated color temperature is irradiated during the day, and incandescent light having a low correlated color temperature is irradiated in the morning and the evening. The manner in which color toning is performed is not limited to this, but performing color toning against a natural rhythm might adversely affect the human body.

Table 2 summarizes the circadian characteristics in the cases of selecting for the first light emitting devices 37 and the second light emitting devices 38 different light emitting devices from among the light emitting device examples 1 to 5, and performing dimming controls based on the dimming rules. Because circadian characteristic values can change even if the same light emitting devices are used when subjected to color toning controls, the results obtained when using the same light emitting devices for the first light emitting devices 37 and the second light emitting devices 38 are listed as comparative examples.

using a lighting apparatus C that includes first light emitting devices having a circadian characteristic 1 value of 1.13 or higher and second light emitting devices having a circadian characteristic 1 value of 0.48 or lower. Furthermore, it can control color toning in the range of 3000K to 5000K by using a lighting apparatus C that includes first light emitting devices having a circadian characteristic 1 value of 0.95 or higher and second light emitting devices having a circadian characteristic 1 value of 0.55 or lower.

Examples 5-1 to 5-3 and Examples 5-4 to 5-6 are two groups of examples subjected to the same color toning

TABLE 2

| Examples/ Comparative Examples | First Light Emitting Device | Correlated Color Temperature/ Chromaticity | Second Light Emitting Device | Correlated Color Temperature/ Chromaticity | Toning Range | Circadian Characteristic 1 | | Circadian Characteristic 2 | |
|---|---|---|---|---|---|---|---|---|---|
| | | | | | | Highest | Lowest | Highest | Lowest |
| Comparative Example 1 | Example 4 | 6500 K | Example 4 | 2700 K | 2700 K-6500 K | 1.116 | 0.439 | 8.66% | 2.16% |
| Example 4-1 | Example 4 | 6500 K | Example 1 | 2700 K | 2700 K-6500 K | 1.116 | 0.439 | 8.66% | 1.60% |
| Example 4-2 | Example 5 | x = 0.149 y = 0.234 | Example 1 | 2700 K | 2700 K-6500 K | 1.240 | 0.439 | 10.34% | 1.60% |
| Comparative Example 2 | Example 4 | 5000 K | Example 4 | 3000 K | 3000 K-5000 K | 0.934 | 0.561 | 7.03% | 2.56% |
| Example 5-1 | Example 2 | 5000 K | Example 1 | 3000 K | 3000 K-5000 K | 0.886 | 0.471 | 5.37% | 1.41% |
| Example 5-2 | Example 4 | 5000 K | Example 1 | 3000 K | 3000 K-5000 K | 0.934 | 0.471 | 7.03% | 1.41% |
| Example 5-3 | Example 5 | x = 0.149 y = 0.234 | Example 1 | 3000 K | 3000 K-5000 K | 0.982 | 0.471 | 7.45% | 1.41% |
| Example 5-4 | Example 2 | 6500 K | Example 1 | 2700 K | 3000 K-5000 K | 0.879 | 0.516 | 5.49% | 2.31% |
| Example 5-5 | Example 4 | 6500 K | Example 1 | 2700 K | 3000 K-5000 K | 0.937 | 0.521 | 7.15% | 2.69% |
| Example 5-6 | Example 5 | x = 0.149 y = 0.234 | Example 1 | 2700 K | 3000 K-5000 K | 1.020 | 0.539 | 8.25% | 2.88% |

In a lighting control system 100 that controls color toning, the circadian characteristics became maximum at the highest of the color toning range, and the circadian characteristics became minimum at the lowest of the color toning range. In the examples, the circadian characteristic 1 and the circadian characteristic 2 of the light emitting device sample 5 are 2.843 and 21.32%, respectively.

As is understood from Table 2, in the case of a lighting control system 100 that controls color toning of the light from the lighting apparatuses 24, the difference between the maximum and the minimum values of the circadian characteristic 1 in the daily cycle can be 0.65 or greater in the color toning range of 2700K to 6500K. Furthermore, the difference can be 0.80 or greater.

Furthermore, the difference between the maximum and the minimum values of the circadian characteristic 1 in the daily cycle can be 0.40 or greater in the color toning range of 3000K to 5000K. Furthermore, the difference can be 0.50 or greater. As such, the controllable range for the circadian characteristic 1 is larger when color toning is performed as compared to performing controls using the same color.

The difference between the maximum and the minimum values of the circadian characteristic 2 in the daily cycle can be 6.50% or greater in the color toning range of 2700K to 6500K. Furthermore, the difference can be 7.00% or greater.

The difference between the maximum and the minimum values of the circadian characteristic 2 in the daily cycle can be 4.50% or greater in the color toning range of 3000K to 5000K. Furthermore, the difference can be 5.00% or greater.

As is understood from Table 2, the lighting control system 100 can control color toning in the range of 2700K to 6500K range, but the correlated color temperature of the light from the first light emitting devices 37 and the correlated color temperature of the light from the second light emitting devices 38 are different (except for the light emitting device example 5). The results in Table 2 show that the values differ even if the color toning range is the same.

Even when color toning in the range of 3000K to 5000K is performed by using 2700K first light emitting devices 37 and 6500K second light emitting devices 38, the difference between the maximum and the minimum values of the circadian characteristic 1 can be 0.40 or greater. Furthermore, the difference can be 0.45 or greater.

It is observed that when employing the same combination of the light emitting device examples in two lighting apparatuses, the lighting apparatus using the light emitting devices that emitting light having a correlated color temperature close to the color toning range tends to further reduce the minimum values of the circadian characteristics, and the lighting apparatus using the light emitting devices that emit light having a correlated color temperature distant from the color toning range further increases the maximum value. Moreover, it is understood that the lighting apparatus having good circadian characteristics can be produced with light emitting devices that emit light having a correlated color temperature that is not close to the color toning range.

In the case of performing color toning in the 3000K to 5000K range, for example, light emitting devices that emit light having a correlated color temperature in the 5000K to 8000K range can be employed for the first light emitting devices 37. For the second light emitting devices 38, light emitting devices having a correlated color temperature in the 1500K to 3000K range can be employed.

In the case of performing color toning in the 2700K to 6500K range, for example, light emitting devices that emit light having a correlated color temperature in the 6500K to 8000K range can be employed for the first light emitting devices 37. For the second light emitting devices 38, light emitting devices that emit light having a correlated color temperature in the 1500K to 2700K range can be used.

When performing color toning, for example, in lieu of light emitting devices that emit light having a correlated color temperature of 8000K at most, those that emit light in the region of the CIE1931 color space chromaticity diagram defined by the first straight line connecting the first point whose x, y coordinates are (0.280, 0.070) and the second point whose x, y coordinates are (0.280, 0.500), the second straight line connecting the second point and the third point whose x, y coordinates are (0.013, 0.500), the pure purple locus extending from the first point towards smaller x values, and the spectral locus extending from the third point towards smaller y values can be employed for the first light emitting devices 37.

Second Embodiment

The lighting control system according to a second embodiment will be explained next. The lighting control system according to the second embodiment differs from the lighting control system according to the first embodiment such that a light fixture includes third light emitting devices, in addition to the first light emitting devices and the third light emitting deices. It also differs from the lighting control system of the first embodiment such that the emission of the first, second, and third light emitting devices is controlled in the lighting apparatus. The other aspects are similar to those of the lighting control system of the first embodiment. Accordingly, except for FIG. 6, FIG. 8, and FIG. 9, the drawings utilized in explaining the first embodiment are also applicable to the second embodiment. The descriptions related to these drawings are also similar.

Figure 14:
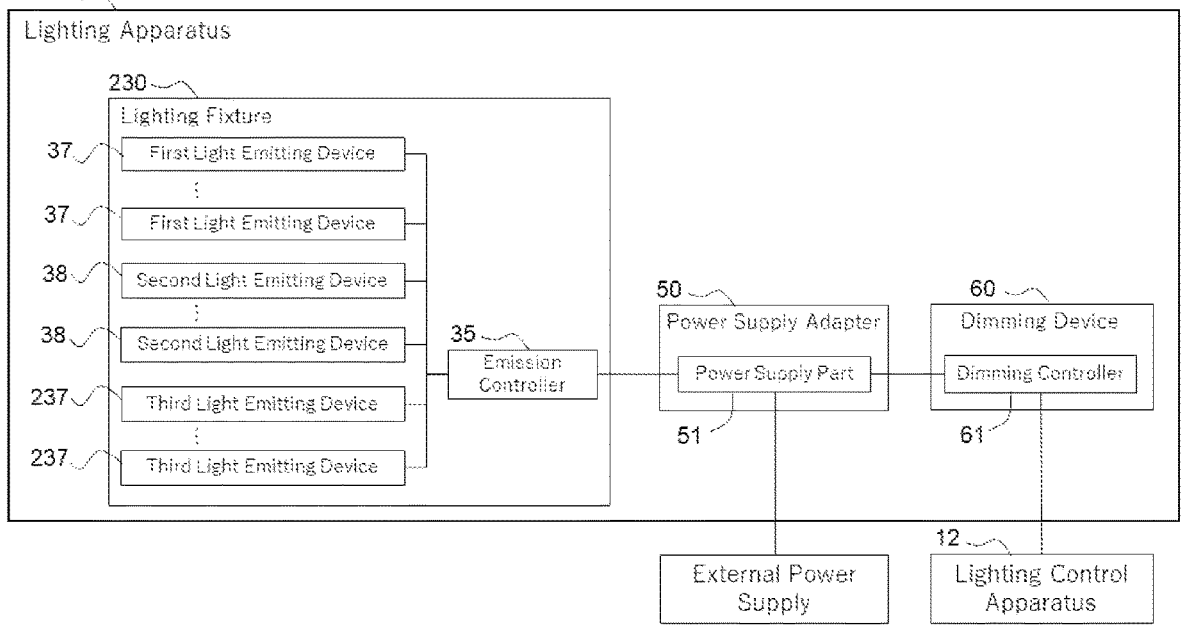
FIG. 14 is a a schematic diagram explaining a lighting apparatus according to the second embodiment.
Figure 15:
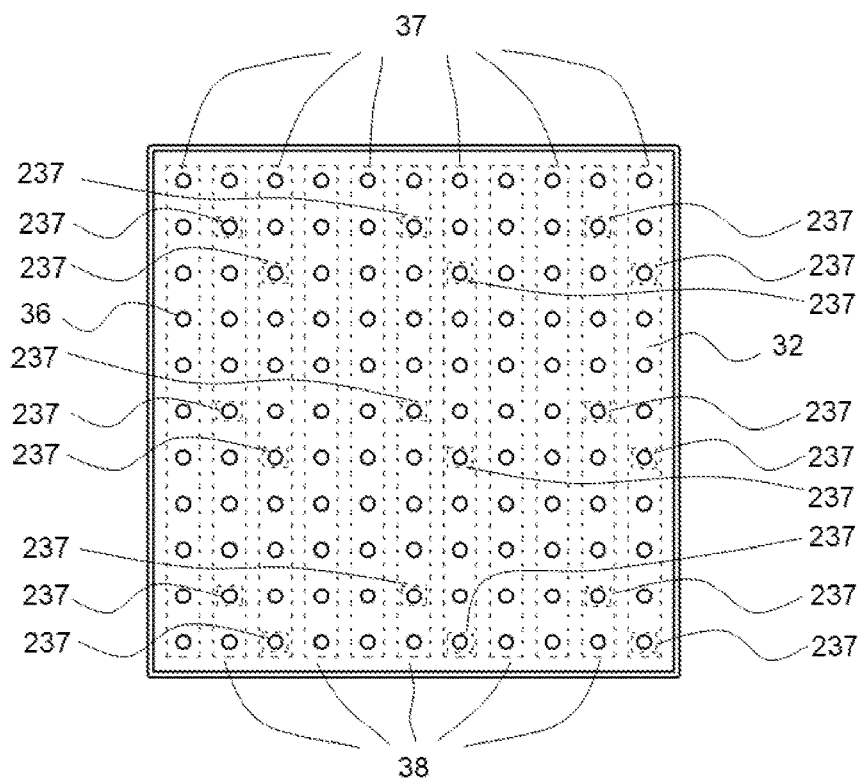
FIG. 15 is a plan view explaining the emission face of a light fixture according to the second embodiment.
Figure 16:
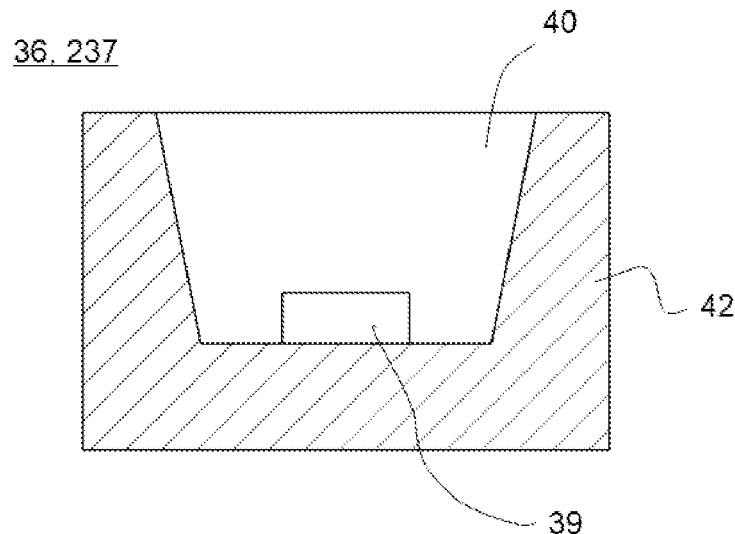
FIG. 16 is a schematic diagram of a light emitting device according to the second embodiment.

FIG. 14 shows one example of a lighting apparatus 224 and the connection between the lighting apparatus 224 and an external device in the lighting control system 200. FIG. 15 is a diagram of the emission face (the opposite face to the ceiling installation face) of a light fixture 230. FIG. 15 shows the light fixture 230 without a cover 33. FIG. 16 is a schematic cross-sectional view of a third light emitting device 237 included in the light fixture 230.

As shown in FIG. 14, in the lighting apparatus 224, third light emitting devices 237 are included as light emitting devices 36 in the light fixture 230. Furthermore, the emission controller 35 can individually control the emission by the third emitting devices 237 in addition to the emission by the first light emitting devices 37 and the emission by the second light emitting devices 38. For example, the emission controller 35 is able to allow only the first light emitting devices 37 or the second light emitting devices 38 to emit light.

Each third light emitting device 237 includes a light emitting element 39, a sealing member 43, and a molded part 42. The sealing member 43 seals the light emitting element 39 and diffuses the light emitted from the light emitting element 39 to be output from the emission face. Third light emitting devices 237 have no wavelength conversion members as compared to the first light emitting devices 37 and the second light emitting deices 38. A wavelength conversion member may be employed in place of the sealing member 43.

The light emitted from a third light emitting device 237 has a peak emission in the range of 360 nm to 400 nm. It can be constructed with, for example, a light emitting element 39 having a peak emission in the range of 360 nm to 400 nm. Furthermore, it is preferable for a third light emitting device 237 to not emit light having 10% or higher of the peak light intensity in the visible spectrum of 420 nm or higher.

It is preferable for a third light emitting device 237 to not emit light having 10% or higher of the peak light intensity in the wavelength range of up to 320 nm. The third light emitting device 237 preferably has a peak emission in the range of 360 nm to 400 nm, and substantially effective emission wavelengths in the 320 nm tot 420 nm range. The phrase "substantially effective emission" in the present disclosure refers to light emission having the light intensity of 10% or more of the peak light intensity.

In the lighting control system 200, the light emitted from the third light emitting devices 237 is not essentially utilized as illumination light. In other words, in a lighting apparatus 224, the white light that should be achieved as illumination light, such as incandescent lamp color, neutral white color, or the like, is achieved without the light emitted from the third light emitting devices 237. The light emitted from the third emitting devices 237, which does not considerably affect color toning or dimming, is provided as auxiliary light to address the effects on the human body.

Accordingly, the number of the third light emitting devices 237 disposed in a lighting apparatus 224 is smaller than the number of the first light emitting devices 37 and smaller than the number of the second light emitting devices 38. Furthermore, the auxiliary light from the third light emitting devices 237 output by the lighting apparatus 224 has a small illuminance as compared to the illumination light produced by the first light emitting devices 37 and the second light emitting devices 38.

In a lighting control system 200, the irradiance (W/m$^2$) of the third light emitting devices 237 is controlled in correspondence with the fluctuations of the circadian characteristics of the illumination light. The color toning control mechanism is similar to that explained in relation to the first embodiment.

For example, in a lighting control system 200, the irradiance (W/m$^2$) of the third light emitting devices 237 is controlled in correspondence with an increase or decrease in the circadian characteristics of the illumination light. For example, the emission of the auxiliary light by the third light emitting devices 237 is controlled in line with the fluctuations of the circadian characteristics of the illumination light illustrated in FIGS. 13A to 13E. When the circadian characteristic value is maximum, the irradiance of light from the third light emitting devices 237 also becomes maximum, and when the circadian characteristic value is minimum, the irradiance of the light from the third light emitting devices 237 also becomes minimum.

For example, the light emitted from a third light emitting devices 237 can be set to have a maximum irradiance of 5.0 W/m$^2$. The minimum irradiance can be set as 0.0 W/m$^2$, i.e., the third light emitting devices 237 are off.

Here, the effect of the auxiliary light provided by the third light emitting devices 237 will be explained. Studies show that exposure to 360 to 400 nm wavelength light is effective in suppressing myopia progression and reducing depression. It is thus preferable to irradiate the auxiliary light emitted by the third light emitting devices 237 in the time period during work hours in which individuals should be working vigorously. Accordingly, one preferable mode of control is to control the light emitted from the third light emitting devices 237 in correspondence with the circadian characteristics.

Because the 360 nm to 400 nm wavelength range is a part of UVA, exposure to this light for a long time causes human skin to experience photodegradation. In the lighting control system 200, the maximum irradiance of the auxiliary light from the third light emitting devices 237 is adjusted by taking this into consideration. Considering the fact that the UVA irradiance in the noon-hour in the middle of summer in Kanagawa Prefecture, Japan is about 50 W/m², for example, the upper limit of the irradiance is preferably set to about ⅕ to about ¹⁄₁₀ of this, i.e., 10 W/m² at most, in the lighting control system 200.

Furthermore, the lighting control system 200 may be adapted to set the upper limit for the duration of the auxiliary light emission by the third light emitting devices 237 so as not to allow the emission to continue beyond the maximum duration. For example, the dimming controller 61 restricts (stops) the auxiliary light emission for a certain period of time once the continuous emission of the auxiliary light reaches the maximum duration before resuming the emission past the time period. As a specific example, the upper limit for the duration can be set to one and a half hours, and the duration of restriction can be set to 30 minutes, which begins when reaching the upper limit.

Avoiding prolonged irradiation can reduce photodegradation. If the first light emitting devices 37 and the second light emitting devices 38 were suddenly turned off, i.e., illumination light is turned off, during work hours, business operations would be hindered. However, the light fixture 230 can remain functional, not hindering business operations, even if the third light emitting devices 237 are turned off.

The lighting control system 200 that controls the third light emitting devices 237 in correspondence with circadian characteristics described above is considered particularly effective in the case of constructing a light fixture 230 with first light emitting devices 37 and second light emitting devices 38 that emit light of the same correlated color temperature. As is understood from the comparison between Table 1 and Table 2 presented in relation to the first embodiment, the amount of change in the circadian characteristic values (the difference between the maximum and the minimum values) is smaller in the cases where the light emitting devices having employed for both the first and second light emitting devices emit light of the same correlated color temperature as compared to the cases where the light emitting devices that emit light of different correlated color temperatures are employed. Accordingly, utilizing auxiliary light in addition to illumination light can invigorate individuals during an appropriate period of time.

Alternatively, for example, a lighting control system 200 can control the irradiance (W/m²) of the third light emitting devices 237 in contrary to an increase or decrease in the circadian characteristics. In other words, the auxiliary light emitted by the third light emitting devices 237 is controlled to fluctuate in the opposite direction of the fluctuations in the circadian characteristics of the illumination light illustrated in FIG. 13A to FIG. 13E. When the circadian characteristic value is maximum, the irradiance of the third light emitting devices 237 becomes minimum, and when the circadian characteristic value is minimum, the irradiance of the third light emitting devices 237 becomes maximum.

The lighting control system 200 that controls the third light emitting devices 237 in contrary to the circadian characteristics described above is considered effective, for example, when controlling lighting by using the first light emitting devices 37 and the second light emitting devices 38 that emit light having different correlated color temperatures in a facility such as a hospital. As is understood from Table 2 presented in relation to the first embodiment, in the cases where the light emitting devices of different color temperatures are used for the first and second light emitting devices, the circadian characteristic values also decrease as the correlated color temperatures decrease. In a hospital room for treating depression patients or the like, for example, there may be a need to reduce the risk of allowing the effect of suppressing invigoration caused by a decline in the circadian characteristics to make a patient feel depressed. Accordingly, irradiating the auxiliary light during the time period of reduced circadian characteristics can promote the patient's mental stability while regulating his/her circadian rhythm.

Variations of Second Embodiment

In the lighting control system 200 of the second embodiment, the third light emitting devices 237 were described as those emitting auxiliary light having a peak emission in the 360 nm to 400 nm range, but the auxiliary light is not limited to this. The third light emitting devices 237 explained in relation to the second embodiment may include a light emitting device that emits light having a peak emission outside of the range of 360 nm to 750 nm in addition to those emitting auxiliary light having a peak emission in the 360 nm to 400 nm range.

For example, auxiliary light having a peak emission in the range of 295 nm to 315 nm that promotes vitamin D generation may be irradiated. However, the light of this wavelength range, which is a part of UVB, has a greater photodegradation impact than UVA. Accordingly, it is preferable to set the maximum irradiance of this light to be lower than that of the auxiliary light having a peak emission in the range of 360 nm to 400 nm.

For the third light emitting devices 237 in the lighting control system 200, those emitting auxiliary light having a peak emission in the 295 nm to 315 nm range, for example, may be employed in place of those emitting auxiliary light having a peak emission in the 360 nm to 400 nm range. For the auxiliary light, one having a peak emission in the wavelength range of up to 400 nm or at least 750 nm, and a light intensity of up to 10% of the peak light intensity in the 420 nm to 730 nm wavelength range can be employed. By controlling the irradiance, the auxiliary light can affect human internal rhythms and mental state.

Although each embodiment of the present invention has been explained above, the technical ideas of the present invention are not limited to those specifically described above. For example, in any embodiment, the installation location of the lighting control system related to the present invention is not limited to an office building. The lighting control system may be built, for example, in a hospital, factory, school, or commercial facility.

The characteristics related to circadian rhythms do not have to be limited to those explained in relation to the embodiments. For example, in the embodiments, MR using the circadian response curve having a peak near 480 nm to 490 nm in FIG. 1 was used for the circadian characteristic 1, but the circadian characteristic values calculated by using the action spectrum for melatonin secretion suppression having a peak near 464 nm prepared by Professor Brainard in place of the circadian response curve may be employed.

Furthermore, in the examples explained above, a light fixture is constructed with first light emitting devices 37 and second light emitting devices 38 that are formed as individual light emitting devices 36, but a first light emitting device 37 and a second light emitting device 38 may be combined in a single light emitting device.

Figure 17A:
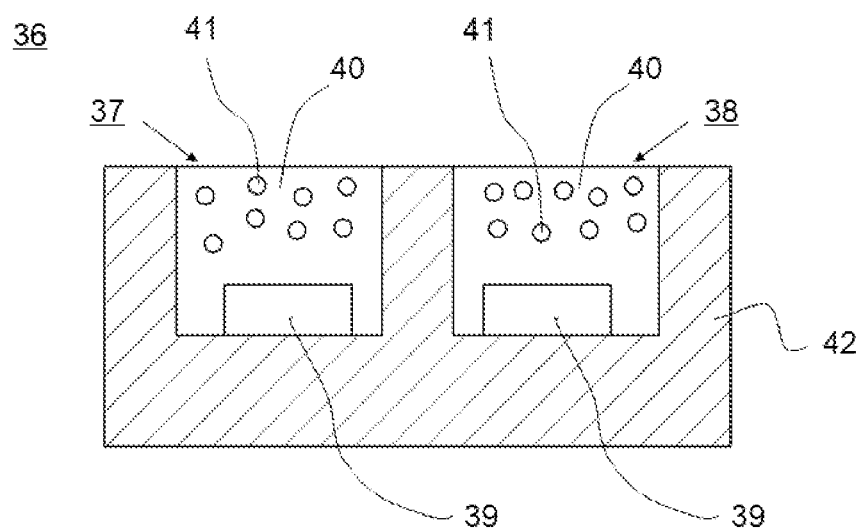
FIG. 17A is a schematic diagram of one example of a plurality of the light emitting devices included in one package.
Figure 17B:
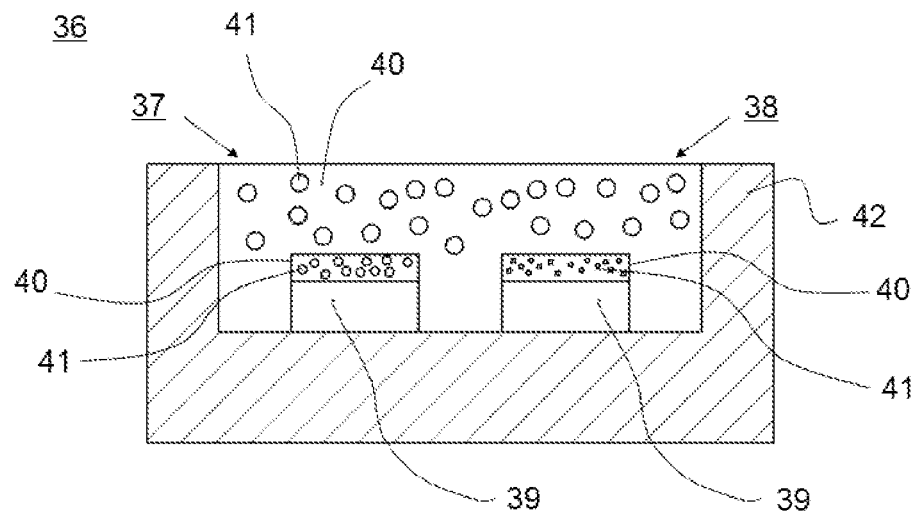
FIG. 17B is a schematic diagram of another example of a plurality of the light emitting devices included in one package.
Figure 17C:
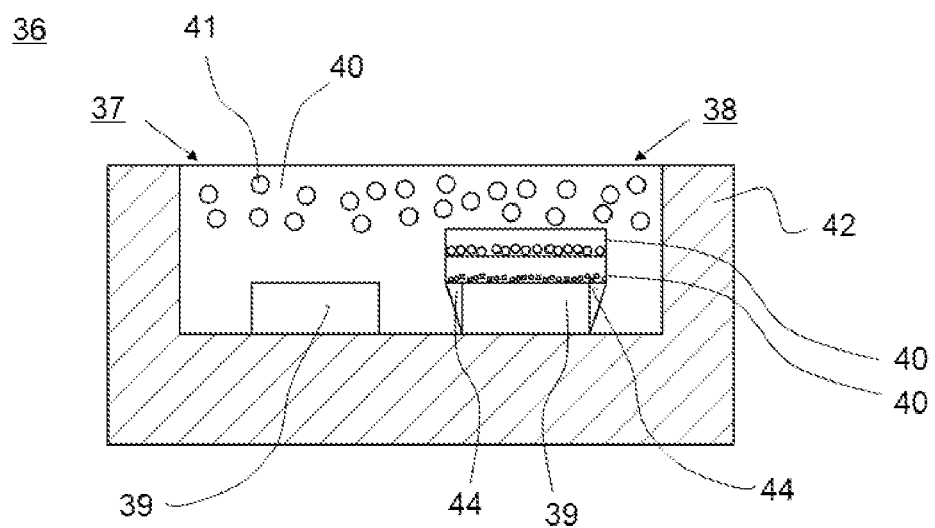
FIG. 17C is a schematic diagram of another example of a plurality of the light emitting devices included in one package.

FIG. 17A to FIG. 17C show some examples of light fixture forms that include a first light emitting device 37 and a second light emitting device 38 formed in the casing of a single light emitting device 36. In any of these cases, the first light emitting device 37 and the second light emitting device 38 share a single molded part 42.

FIG. 17A shows a form of the light emitting device 36 having two cavities provided by a single molded part 42 where a light emitting element 39 of the first light emitting device 37 and a wavelength conversion member 40, and a light emitting element 39 for the second light emitting device 38 and a wavelength conversion member 40 are separately disposed in the cavities.

FIG. 17B shows a form of the light emitting device 36 having a single cavity provided by a single molded part 42 where a light emitting element 39 of the first light emitting device 37 and wavelength conversion members 40 thereon, a light emitting element 39 for the second light emitting device 38 and wavelength conversion members 40 thereon are disposed in the cavity.

The wavelength conversion member 40 for the light emitted from the first light emitting device 37 that is unnecessary for the light emitted from the second light emitting device 38 is disposed only on the light emitting element 39 of the first light emitting device 37. Similarly, the wavelength conversion member 40 for the light emitted from the second light emitting device 38 that is unnecessary for the light emitted from the first light emitting device 37 is disposed only on the light emitting element 39 of the second light emitting device 38. The wavelength conversion member 40 that is needed for the light emitted from both the first light emitting device 37 and the second light emitting device 38 is disposed to cover the first light emitting device 37 and the second light emitting device 38.

FIG. 17C shows a form of the light emitting device 36 having a single cavity provided by a single molded part 42 where a light emitting element 39 of the first light emitting device 37, a light emitting element 39 for the second light emitting device 38 and wavelength conversion members 40 thereon are disposed in the cavity.

In comparison to FIG. 17B, there is no wavelength conversion member 40 for the light emitted from the first light emitting device 37. The wavelength conversion member 40 for the light emitted from the second light emitting device 38 that is unnecessary for the light emitted from the first light emitting device 37 is disposed only on the light emitting element of the second light emitting device 38.

The wavelength conversion member 40 disposed only on the light emitting element 39 of the second light emitting device 38 is multilayered. This may be a single layer. In each layer, phosphors are localized near the lower face. For example, adhering a phosphor sheet to a glass material can form such a wavelength conversion member 40.

The lateral faces of the light emitting element 39 of the second light emitting device 38 are covered by a reflecting layer 44. This allows the light from the light emitting element 39 of the first light emitting device 37 to be reflected by the reflecting layer 44 without entering the light emitting element 39 of the second light emitting device 38. Accordingly, this can restrain the light emitted from the light emitting element 39 of the first light emitting device 37 from being converted by the wavelength conversion member 40 disposed only on the light emitting element 39 of the second light emitting device 38.

The present invention is applicable to a device even if the device does not include all of the constituent elements of the device disclosed in the embodiments described above. Even in the event that a certain constituent element of a device is not recited in a claim, the present invention is applicable so long as the device falls within the scope of design flexibility for a person of ordinary skill in the art. The present invention is disclosed based on this premise.

The lighting control systems or the light fixtures disclosed in the embodiments can be used in lighting systems installed in an indoor space or the like.

What is claimed is:

1. A lighting control system comprising:
    a light fixture comprising:
        a first light emitting device configured to emit light having a correlated color temperature in the range of ±500 K from a prescribed value,
        a second light emitting device configured to emit light having a correlated color temperature in the range of ±500 K from the prescribed value, and
        an emission controller configured to cause the light fixture to irradiate illumination light by controlling irradiation percentages of the light emitted from the first light emitting device and the light emitted from the second light emitting device; and
    an information processing apparatus communicably connected to the light fixture, the information processing apparatus comprising a dimming controller configured to change the irradiation percentages of the light emitted from the first light emitting device and the light emitted from the second light emitting device of the light fixture in accordance with a time of day by transmitting dimming instructions;
    wherein the emission controller is configured to control the irradiation percentages of the light emitted from the first light emitting device and the light emitted from the second light emitting device based on the dimming instructions such that a difference between a maximum melanopic ratio of the illumination light and a minimum melanopic ratio of the illumination light is 0.031 or higher in a time period during which the illumination light is irradiated.

2. The lighting control system according to claim 1, wherein:
    the prescribed value is 6500K or higher.

3. The lighting control system according to claim 2, wherein:
    the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.053 or higher in a time period during which the illumination light is irradiated.

4. The lighting control system according to claim 2, wherein:
    the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.87 or higher in a time period during which the illumination light is irradiated.

5. The lighting control system according to claim 2, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.118 or higher in a time period during which the illumination light is irradiated.

6. The lighting control system according to claim 2, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.135 or higher in a time period during which the illumination light is irradiated.

7. The lighting control system according to claim 2, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.168 or higher in a time period during which the illumination light is irradiated.

8. The lighting control system according to claim 1, wherein:
the prescribed value is in the range of 5000K to 5750K,
the first light emitting device configured to emit the light having a correlated color temperature in the range of ±250 K from the prescribed value,
a second light emitting device configured to emit the light having a correlated color temperature in the range of ±250 K from the prescribed value.

9. The lighting control system according to claim 8, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.053 or higher in a time period during which the illumination light is irradiated.

10. The lighting control system according to claim 8, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.087 or higher in a time period during which the illumination light is irradiated.

11. The lighting control system according to claim 8, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.135 or higher in a time period during which the illumination light is irradiated.

12. The lighting control system according to claim 8, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.168 or higher in a time period during which the illumination light is irradiated.

13. The lighting control system according to claim 1, wherein:
the prescribed value is in the range of 3400K to 4600K,
the first light emitting device configured to emit the light having a correlated color temperature in the range of ±150 K from the prescribed value,
a second light emitting device configured to emit the light having a correlated color temperature in the range of ±150 K from the prescribed value.

14. The lighting control system according to claim 13, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.101 or higher in a time period during which the illumination light is irradiated.

15. The lighting control system according to claim 13, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.118 or higher in a time period during which the illumination light is irradiated.

16. The lighting control system according to claim 1, wherein:
the prescribed value is in the range of 2700K to 3150K,
the first light emitting device configured to emit the light having a correlated color temperature in the range of ±100 K from the prescribed value,
a second light emitting device configured to emit the light having a correlated color temperature in the range of ±100 K from the prescribed value.

17. The lighting control system according to claim 16, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.101 or higher in a time period during which the illumination light is irradiated.

18. The lighting control system according to claim 17, wherein:
the emission controller is configured to control the irradiation percentages of the light emitted from the first light emitting device and the light emitted from the second light emitting device based on the dimming instructions such that the difference between a maximum melanopic ratio of the illumination light and a minimum melanopic ratio of the illumination light is 0.118 or higher in a time period during which the illumination light is irradiated.

* * * * *